(12) United States Patent
Azuma

(10) Patent No.: US 12,368,806 B2
(45) Date of Patent: Jul. 22, 2025

(54) INSPECTION SYSTEM AND CONTROL METHOD OF INSPECTION SYSTEM

(71) Applicant: CANON KABUSHIKI KAISHA, Tokyo (JP)

(72) Inventor: Erika Azuma, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/187,125

(22) Filed: Mar. 21, 2023

(65) Prior Publication Data
US 2023/0308548 A1   Sep. 28, 2023

(30) Foreign Application Priority Data
Mar. 25, 2022   (JP) ................................. 2022-049280

(51) Int. Cl.
*G06T 7/00* (2017.01)
*H04N 1/00* (2006.01)

(52) U.S. Cl.
CPC ......... *H04N 1/00005* (2013.01); *G06T 7/001* (2013.01); *H04N 1/00045* (2013.01); *H04N 1/00408* (2013.01); *G06T 2200/24* (2013.01); *G06T 2207/30144* (2013.01)

(58) Field of Classification Search
CPC ............. H04N 1/00005; H04N 1/0004; H04N 1/0003; H04N 1/004; G06T 7/001; G06T 7/0002; G06T 2207/30144
USPC ............... 358/1.9, 3, 26, 1.13, 504; 382/112
See application file for complete search history.

(56) References Cited

U.S. PATENT DOCUMENTS

| 2021/0141577 | A1  | 5/2021  | Ito |
| 2021/0216261 | A1* | 7/2021  | Kobashi ............. H04N 1/00005 |
| 2021/0334953 | A1* | 10/2021 | Seki ...................... G01N 21/892 |
| 2021/0397386 | A1* | 12/2021 | Hayashi ................ G06F 3/1275 |

FOREIGN PATENT DOCUMENTS

| JP | 2021165020 A | 10/2021 |
| JP | 2021196310 A | 12/2021 |
| WO | 2015114833 A1 | 8/2015 |

\* cited by examiner

*Primary Examiner* — Jamares Q Washington
(74) *Attorney, Agent, or Firm* — Canon U.S.A., Inc. IP Division

(57) ABSTRACT

An inspection system includes at least an inspection apparatus, a printing apparatus, and an information processing apparatus, wherein the inspection apparatus includes controllers, the controllers configured to receive an inspection setting for a registered reference image, and to transmit a predetermined notification to the information processing apparatus based on completion of an inspection setting, wherein the information processing apparatus includes controllers, the controllers configured to transmit a main print job for executing inspection to the printing apparatus if the predetermined notification is received, wherein the printing apparatus includes the controllers configured to perform printing based on the main print job if the main print job is received and to generate a scan image by reading a printed matter printed, and wherein the inspection apparatus further includes an inspection unit configured to execute inspection of the received scan image based on the inspection setting received.

10 Claims, 14 Drawing Sheets

FIG.4A

```
CONFIGURATION
─────────────────────────────────────────────
0401 ── IMAGE STORAGE DESTINATION:
        [\\filepath\group\category\title\name\date]  [CHANGE]

┌─ OPERATION MODE SETTING: ──────────┐
0402 ── │  ○ LOG MODE                         │
        │  ● PURGE MODE                       │
        └─────────────────────────────────────┘
```

FIG.4B

```
CONFIGURATION SERVICE MODE
─────────────────────────────────────────────

0403 ── ┌─ RECOVERY SETTING: ────────────────┐
        │  ○ NO-RECOVERY MODE                 │
        │  ● RECOVERY MODE                    │
        └─────────────────────────────────────┘

[ OK ]  [ CANCEL ]
```

FIG.5

INSPECTION STATUS

INSPECTION_yyyy/mm/dd.pdf — 0501

UNDER INSPECTION — 0503

STOP INSPECTION — 0502

| INSPECTED: | FAIL: | PERCENT DEFECTIVE: |
|---|---|---|
| 100 | 2 | 2% |

| POSITIONAL SHIFT: | CIRCULAR DEFECT: | STREAKY DEFECT: | ERROR: |
|---|---|---|---|
| 0 | 1 | 0 | 1 |

0504

| SHEET NO. | FRONT/BACK | POSITIONAL SHIFT | CIRCULAR DEFECT | STREAKY DEFECT | ERROR | INSPECTION DATE AND TIME | DETAILED DISPLAY |
|---|---|---|---|---|---|---|---|
| 22 | FRONT | PASS | PASS | PASS | — | 2020/8/20 18:22:55 | DETAILS |
| 50 | BACK | PASS | FAIL | PASS | FAIL | 2020/8/20 18:24:49 | DETAILS |

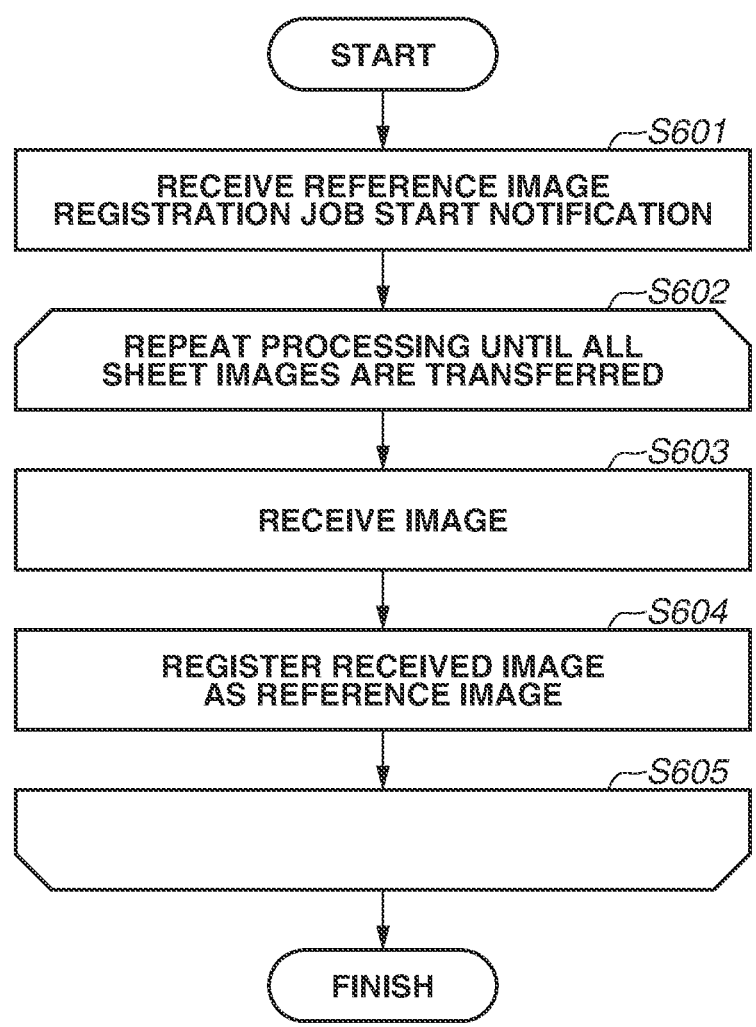

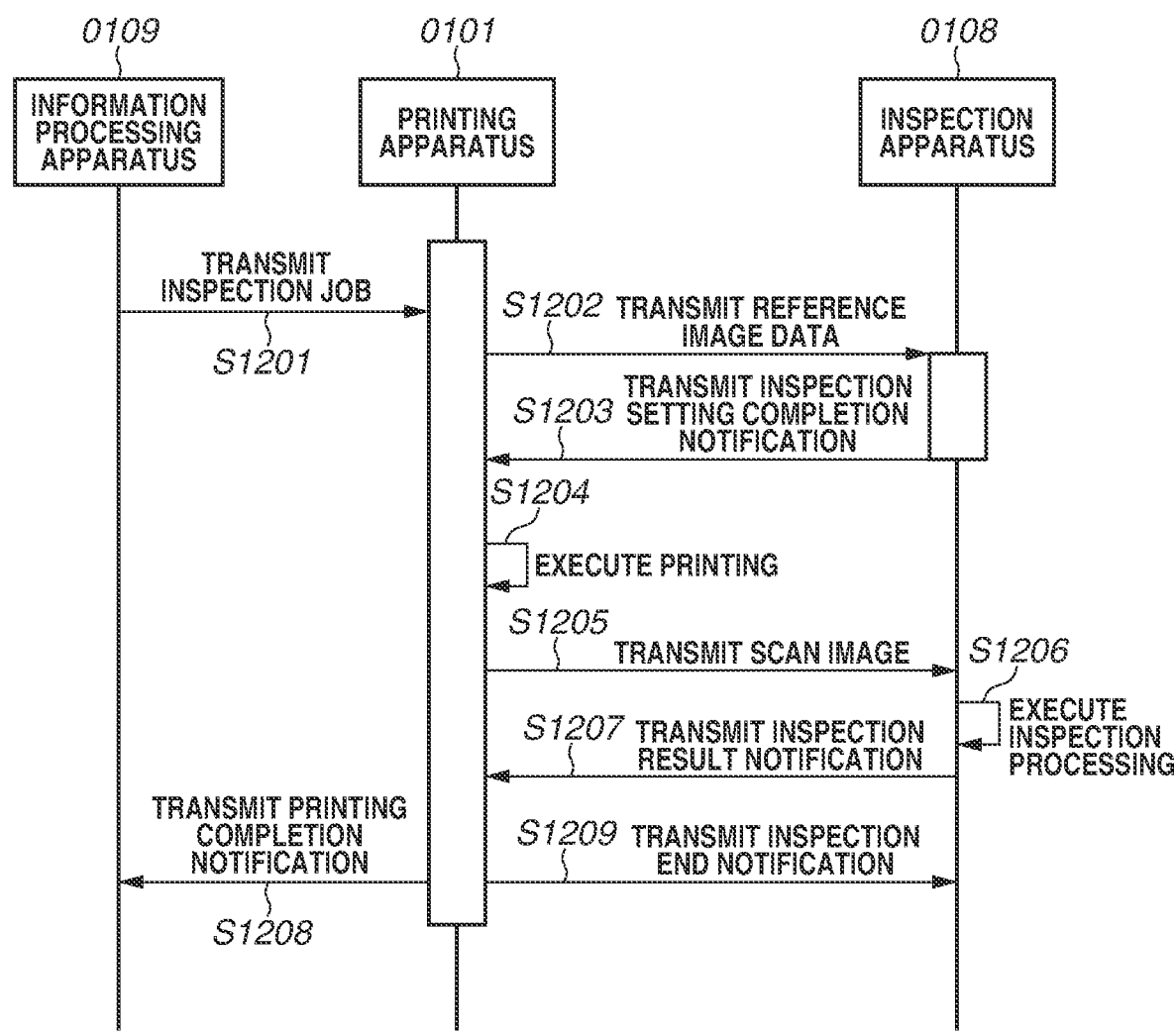

INSPECTION SYSTEM AND CONTROL METHOD OF INSPECTION SYSTEM

BACKGROUND OF THE INVENTION

Field of the Invention

The present invention relates to an inspection system and a control method of an inspection system.

Description of the Related Art

There has been known an inspection apparatus that reads a printed matter printed by an image forming apparatus (printing apparatus) and inspects the printed matter for a quality level. The inspection apparatus can detect an image defect such as a stain and a missing image. In such inspections, a method is employed where a printed matter is compared with an image including no defect that is registered as a reference image. For this reason, it is necessary to initially register a reference image in an inspection apparatus, and processing for registration will be referred to as a reference image registration job. Subsequently, a user makes an inspection setting of setting a detection region in which a defect is to be detected in a main print job, and a threshold value for the reference image. When the inspection setting ends, the user executes the main print job of detecting a defect by comparing an actual printed matter with the registered reference image.

A print job to be inspected in an inspection apparatus will be referred to as an inspection job. The execution of the inspection job is performed in the following three steps.

Execution of a reference image registration job
Inspection setting
Execution of a main print job Japanese Patent Application Laid-Open No. 2021-165020 discusses receiving start and end instructions of image reading from a user in both a reference image registration job and a main print job as a method of controlling execution of the reference image registration job and the main print job.

SUMMARY OF THE INVENTION

According to an aspect of the present invention, an inspection system includes at least an inspection apparatus, a printing apparatus, and an information processing apparatus that are communicable with each other, wherein the inspection apparatus includes one or more controllers having one or more processors and one or more memories, the one or more controllers configured to function as a reception unit configured to receive an inspection setting for a registered reference image, and a first transmission unit configured to transmit a predetermined notification to the information processing apparatus based on completion of an inspection setting received by the reception unit, wherein the information processing apparatus includes one or more controllers having one or more processors and one or more memories, the one or more controllers configured to function as a second transmission unit configured to transmit a main print job for executing inspection to the printing apparatus if the predetermined notification is received, wherein the printing apparatus includes a printing unit configured to perform printing based on the main print job if the main print job is received, and a reading unit configured to generate a scan image by reading a printed matter printed by the printing unit, and wherein the inspection apparatus further includes an inspection unit configured to execute inspection of the received scan image based on the inspection setting received by the reception unit.

Further features of the present invention will become apparent from the following description of exemplary embodiments with reference to the attached drawings.

BRIEF DESCRIPTION OF THE DRAWINGS

FIGS. 4A and 4B illustrate setting screens of the inspection apparatus to designate an operation mode of the inspection apparatus and the inspection unit.

FIG. 5 illustrates a screen of an inspection status to be displayed on the inspection apparatus at the time of inspection.

FIG. 6 is a flowchart illustrating an operation to be performed by the inspection apparatus at the time of reference image registration.

FIG. 12 illustrates an example of an inspection procedure in an inspection system.

DESCRIPTION OF THE EMBODIMENTS

Hereinafter, the present exemplary embodiment will be described with reference to the drawings. It should be appreciated that, unless otherwise specified, the present exemplary embodiment can be applied to both a single device and an inspection apparatus including a plurality of devices as long as a function according to the present exemplary embodiment is implemented. In addition, unless otherwise specified, an inspection apparatus may perform processing using the devices connected via a network such as a local area network (LAN) or a wide area network (WAN) as long as the function according to the present exemplary embodiment is implemented. In other words, a configuration of a system to which various terminals are connected to be described in the following exemplary embodiment is an example, and it should be appreciated that there are various configuration examples depending on a use application and a purpose.

Figure 1:
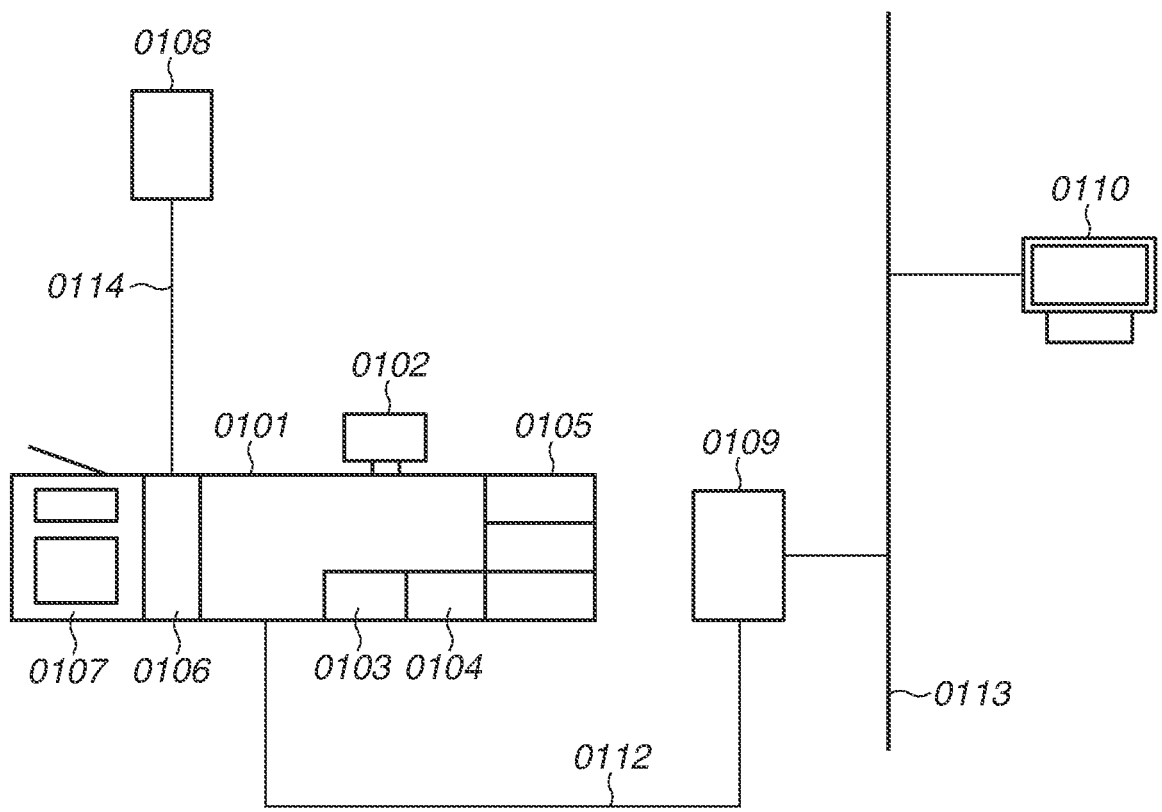
FIG. 1 is a schematic diagram illustrating configurations of an information processing apparatus, an inspection apparatus, and a printing apparatus.

FIG. 1 is a schematic diagram illustrating a configuration of an inspection system according to the present exemplary embodiment that includes an information processing apparatus, an inspection apparatus, and a printing apparatus. The information processing apparatus, the inspection apparatus, and the printing apparatus can communicate with each other via a network. The description will be given using an electrophotographic printing apparatus as the printing apparatus according to the present exemplary embodiment, but the printing apparatus according to the present exemplary embodiment may be a printing apparatus of a different image formation method such as an inkjet method or an offset method.

A printing apparatus 0101 is connected with an information processing apparatus 0109 via a cable 0112. The information processing apparatus 0109 is connected with a client computer 0110 via a network 0113.

The printing apparatus 0101 includes a user interface (UI) panel 0102, and paper feed decks 0103 and 0104. Furthermore, an optional deck 0105 including three paper feed decks is connected to the printing apparatus 0101. The printing apparatus 0101 is an electrophotographic printing apparatus, for example. The UI panel 0102 is a user interface including a capacitive touch panel, for example.

The printing apparatus 0101 further includes an inspection unit 0106 and a large-capacity stacker 0107. The inspection unit 0106 is connected with an inspection apparatus 0108 via a cable 0114. The large-capacity stacker 0107 includes a main tray and a top tray. A few thousand sheets can be stacked on the main tray at one time.

A print job is generated in the client computer 0110, transmitted to the information processing apparatus 0109 via the network 0113, and managed by the information processing apparatus 0109. Then, the print job is transmitted from the information processing apparatus 0109 to the printing apparatus 0101 via the cable 0112, and the printing apparatus 0101 performs printing processing onto a sheet. As another configuration, a print job may be generated and managed in the information processing apparatus 0109, transmitted to the printing apparatus 0101 via the cable 0112, and managed in the printing apparatus 0101.

The client computer 0110, the information processing apparatus 0109, and the inspection apparatus 0108 may be connected to the cable 0112 and enabled to communicate with the printing apparatus 0101. As another configuration, the inspection apparatus 0108 may be connected to the information processing apparatus 0109 and the client computer 0110 via the network 0113. In other words, a connection configuration of the printing apparatus 0101, the information processing apparatus 0109, and the client computer 0110 that is described in the present exemplary embodiment is an example, and it should be appreciated that there are various connection configurations aside from the connection configuration described in the present exemplary embodiment.

Aside from the inspection unit 0106 and the large-capacity stacker 0107, a finisher that can execute stapling, a folding apparatus, and a bookbinding apparatus may be connected to the printing apparatus 0101.

Figure 2:
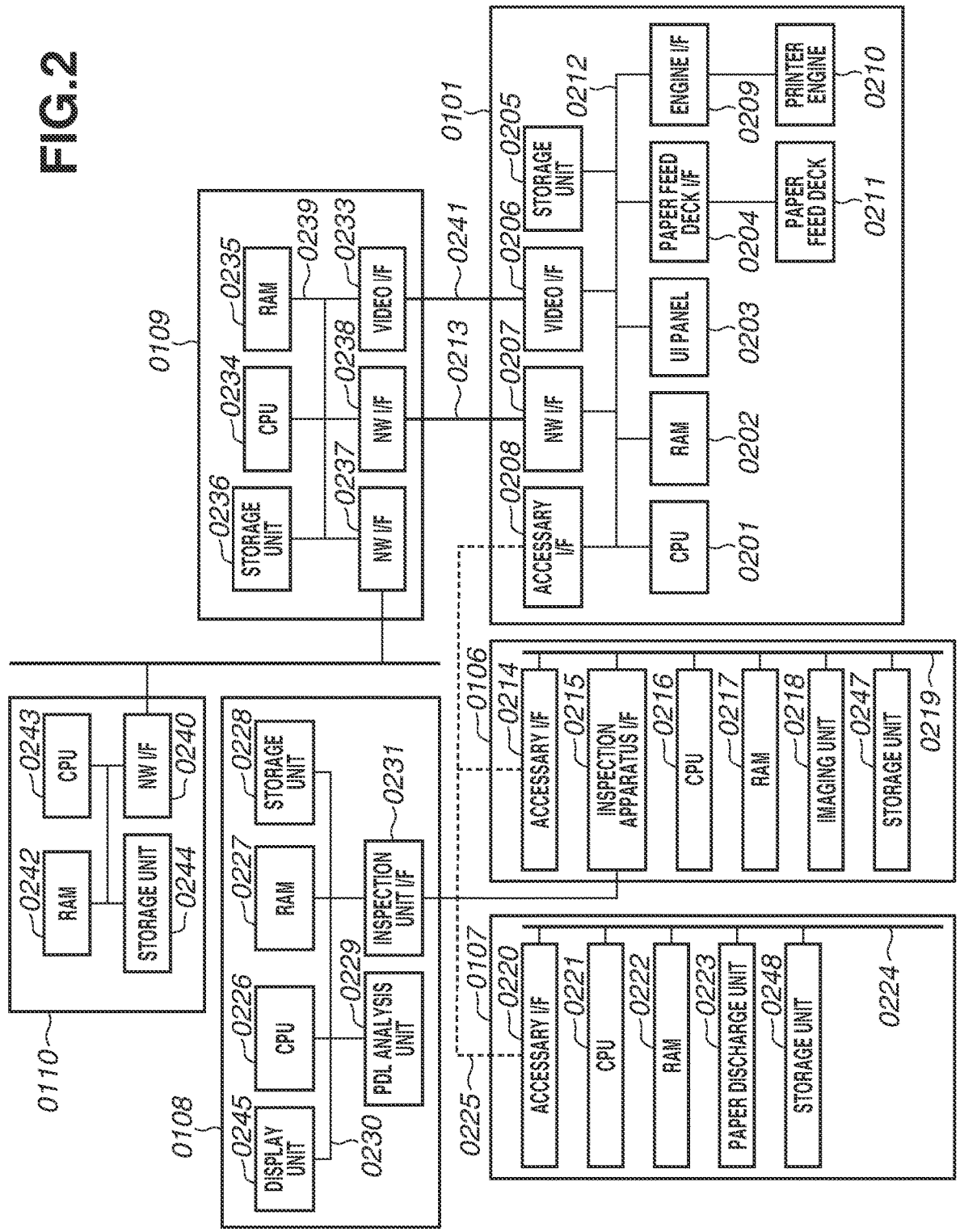
FIG. 2 is a block diagram illustrating configurations of the information processing apparatus, the inspection apparatus, and the printing apparatus.

FIG. 2 is a block diagram illustrating control configurations of the printing apparatus 0101, the inspection apparatus 0108, the large-capacity stacker 0107, the information processing apparatus 0109, and the client computer 0110 according to the present exemplary embodiment.

A central processing unit (CPU) 0201 governs control and calculation in each component in the printing apparatus 0101 via a system bus 0212. The CPU 0201 governs execution of a program stored in a storage unit 0205 and loaded into a random access memory (RAM) 0202. The RAM 0202 is one type of general volatile storage device directly accessible from the CPU 0201, and is used as a work area of the CPU 0201 or another temporary data storage area. The storage unit 0205 functions as a temporary storage area and a working memory that are to be used when the printing apparatus 0101 operates.

An engine interface (I/F) 0209 governs communication with and control of a printer engine 0210. A paper feed deck I/F 0204 governs communication with and control of a paper feed deck 0211. The paper feed deck 0211 collectively refers to the paper feed decks 0103 and 0104, and the optional deck 0105 as a hardware configuration. A UI panel 0203 is a hardware configuration of the UI panel 0102, and is a user interface for performing general operations of the printing apparatus 0101. In the present exemplary embodiment, the UI panel 0203 includes a capacitive touch panel.

A network interface (hereinafter, NW I/F) 0207 is connected with a NW I/F 0238 of the information processing apparatus 0109 via a cable 0213, and governs communication between the information processing apparatus 0109 and the printing apparatus 0101. In this example, the interfaces connected to system buses 0212 and 0239 are directly connected, but the information processing apparatus 0109 and the printing apparatus 0101 may be connected via a network, for example, and a connection form thereof is not limited. A video I/F 0206 is connected with a video I/F 0233 via a video cable 0241, and governs image data communication between the information processing apparatus 0109 and the printing apparatus 0101.

As a connection interface of the information processing apparatus 0109 to be used for connection with the printing apparatus 0101, the functions of the NW I/F 0238 and the video I/F 0233 may be integrated. As a connection interface of the printing apparatus 0101 to be used for connection with the information processing apparatus 0109, the functions of the NW I/F 0207 and the video I/F 0206 may be integrated.

An accessory I/F 0208 connects with accessory I/Fs 0214 and 0220 via a cable 0225. In other words, the printing apparatus 0101 communicates with the inspection unit 0106 and the large-capacity stacker 0107 via the accessory I/Fs 0208, 0214, and 0220.

A CPU 0216 governs, via a system bus 0219, control and calculation in each component in the inspection unit 0106, and execution of a program stored in a storage unit 0247 and loaded into a RAM 0217. The RAM 0217 is one type of general volatile storage device directly accessible from the CPU 0216, and is used as a work area of the CPU 0216 or another temporary data storage area. The storage unit 0247 functions as a temporary storage area and a working memory that are to be used when the inspection unit 0106 operates. An inspection apparatus I/F 0215 connects with an inspection unit I/F 0231 via a cable. In other words, the inspection unit 0106 communicates with the inspection apparatus 0108 via the inspection apparatus I/F 0215 and the inspection unit I/F 0231.

An imaging unit 0218 has an imaging function equipped with a conduct image sensor (hereinafter, CIS), for example. The imaging unit 0218 captures an image of a sheet passing through the inside of the inspection unit 0106, and transmits the captured image to the inspection apparatus 0108 via the inspection apparatus I/F 0215. The CIS included in the imaging unit 0218 is an example of a sensor. The sensor may be a sensor of another type such as a charge-coupled device (CCD) image sensor, and an image capturing method of the sensor is not limited. There are two purposes of the transmission of the captured image. One is to capture an image of a printed matter of a print job to be inspected and to transmit the captured image to the inspection apparatus 0108 for inspection, irrespective of an inspection method. The other is to print one copy or a plurality of copies of a print job and capture an image or images thereof for generation of a reference image before the print job to be inspected and to transmit the image to the inspection apparatus 0108 as a reference image in a case where the inspection method is scan inspection. In the inspection apparatus 0108, the transmitted image is stored in a storage unit 0228 as a reference image.

A CPU 0221 governs, via a system bus 0224, control and calculation in each component in the large-capacity stacker 0107 and execution of a program stored in a storage unit 0248 and loaded into a RAM 0222. The RAM 0222 is one type of general volatile storage device directly accessible from the CPU 0221, and is used as a work area of the CPU 0221 or another temporary data storage area. The storage unit 0248 functions as a temporary storage area and a working memory that are to be used when the inspection apparatus 0108 operates. A paper discharge unit 0223 governs paper discharge operations onto the main tray and the top tray, and monitoring and control of stacking statuses of the main tray and the top tray.

A CPU 0226 governs, via a system bus 0230, control and calculation in each component in the inspection apparatus 0108, and execution of a program stored in the storage unit 0228 and loaded into a RAM 0227. The RAM 0227 is one type of general volatile storage device directly accessible from the CPU 0226, and is used as a work area of the CPU 0226 or another temporary data storage area. The storage unit 0228 functions as a temporary storage area and a working memory that are to be used when the inspection apparatus 0108 operates. A page-description language (PDL) analysis unit 0229 reads PDL data such as Portable Document Format (PDF) data, PostScript data, or Printer Control Language (PCL) data, for example, that has been received from the client computer 0110 or the information processing apparatus 0109, and executes interpretation processing. A display unit 0245 is a liquid crystal display connected to the inspection apparatus 0108, for example. The display unit 0245 receives input into the inspection apparatus 0108 that has been made by a user, and displays a state of the inspection apparatus 0108.

A CPU 0234 governs, via a system bus 0239, control and calculation in each component in the information processing apparatus 0109, and execution of a program stored in a storage unit 0236 and loaded into a RAM 0235. The RAM 0235 is one type of general volatile storage device directly accessible from the CPU 0234, and is used as a work area of the CPU 0234 or another temporary data storage area. The storage unit 0236 functions as a temporary storage area and a working memory that are to be used when the information processing apparatus 0109 operates. A NW I/F 0237 is connected with a NW I/F 0240 via a network. The information processing apparatus 0109 communicates with the client computer 0110 via the NW I/F 0237 and the NW I/F 0240.

As another configuration, the inspection apparatus 0108 may include a NW I/F, and the information processing apparatus 0109 may communicate with the inspection apparatus 0108 via the NW I/F and the NW I/F 0237. For example, a case where a raster image processor (RIP) image to be used by the printing apparatus 0101 in printing is used as a reference image will be considered. In this case, the reference image may be transmitted to the inspection apparatus 0108 via the inspection apparatus I/F 0215, or may be transmitted to the inspection apparatus 0108 from the NW I/F included in the inspection apparatus 0108 via the NW I/F 0207 and the NW I/F 0237.

A CPU 0243 governs, via a system bus, control and calculation in each component in the client computer 0110, and execution of a program stored in a storage unit 0244 and loaded into a RAM 0242. The RAM 0242 is one type of general volatile storage device directly accessible from the CPU 0243, and is used as a work area of the CPU 0243 or another temporary data storage area. The storage unit 0244 functions as a temporary storage area and a working memory that are to be used when the client computer 0110 operates.

Figure 3:
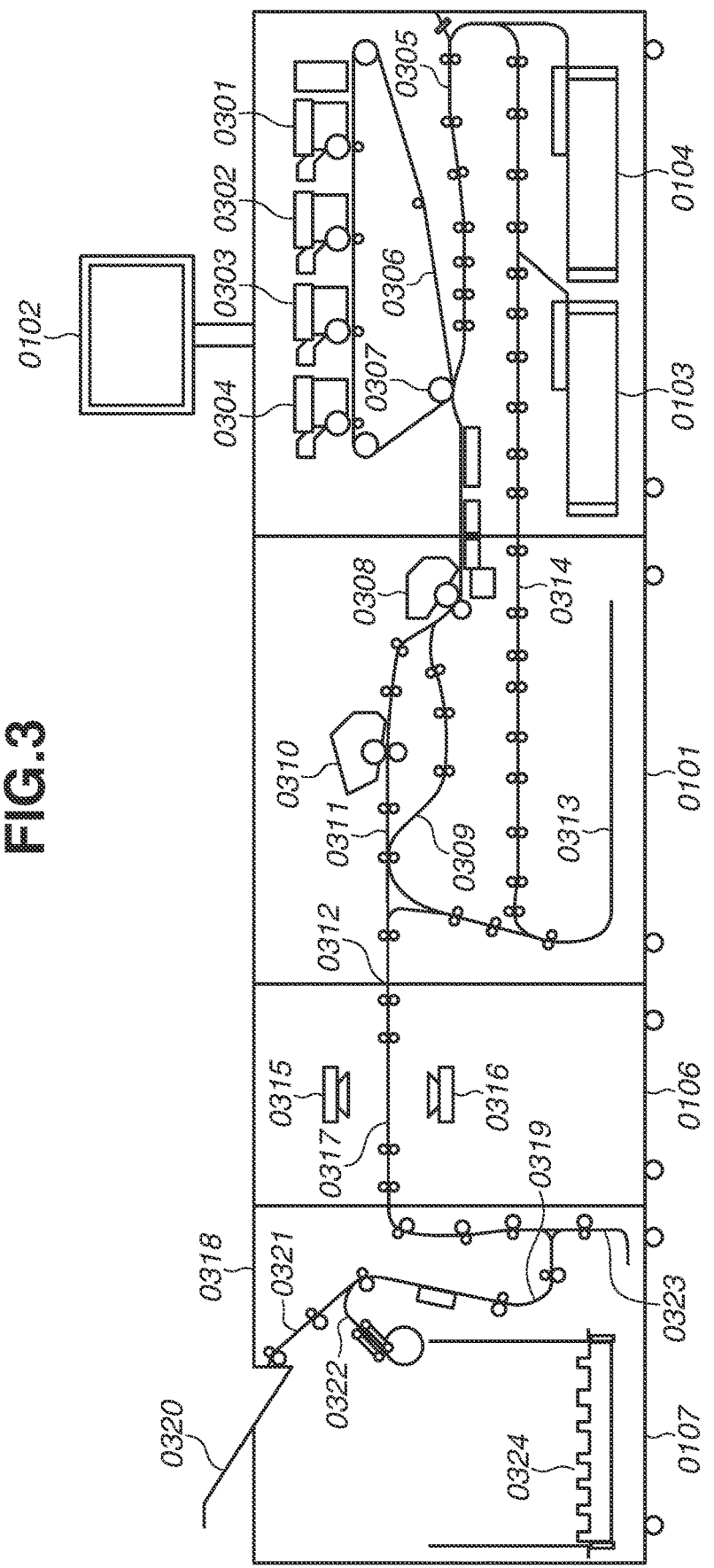
FIG. 3 is a diagram illustrating internal configurations of the information processing apparatus, an inspection unit, the printing apparatus, and a large-capacity stacker.

FIG. 3 is a diagram illustrating internal configurations of the printing apparatus 0101, the inspection unit 0106, and the large-capacity stacker 0107. The printing apparatus 0101 receives input made by the user via the UI panel 0102, and displays states of printing and devices. Various sheets can be stored in the paper feed decks 0103 and 0104. In each of the paper feed decks, only one topmost sheet of the stored sheets is separated and conveyed to a sheet conveyance path 0305. To form a color image, development stations 0301 to 0304 form toner images using colored toner in Y, M, C, and K colors. The toner images formed by the development stations 0301 to 0304 are primarily transferred to an intermediate transfer belt 0306. The intermediate transfer belt 0306 rotates clockwise in FIG. 3, and the toner images are transferred to a sheet conveyed from the sheet conveyance path 0305 at a secondary transfer position 0307.

A fixing unit 0308 includes a pressure roller and a heat roller. A sheet passes through a space between the rollers, and toner is melted and pressure-fixed onto the sheet. The toner image is thereby fixed onto the sheet. The sheet having passed through the fixing unit 0308 is conveyed to a sheet conveyance path 0312 through a sheet conveyance path 0309. In a case where further melting and pressure fixing are required for fixing depending on the type of sheet, after having passed through the fixing unit 0308, the sheet is conveyed to a second fixing unit 0310 using an upper sheet conveyance path, and after additional melting and pressure fixing are performed, the sheet is conveyed to the sheet conveyance path 0312 through a sheet conveyance path 0311. In a case where an image forming mode is a duplex mode, a sheet is conveyed to a sheet reversing path 0313, and after the sheet is reversed on the sheet reversing path 0313, the sheet is conveyed to a duplex conveyance path 0314, and an image on a second surface is transferred at the secondary transfer position 0307.

CISs 0315 and 0316 are arranged in the inspection unit 0106 facing each other. The CIS 0315 is a sensor serving as a reading unit for reading the top surface of the sheet, and the CIS 0316 is a sensor serving as a reading unit for reading the bottom surface of the sheet. The inspection unit 0106 scans a sheet using the CISs 0315 and 0316 at a timing at which the sheet conveyed to a sheet conveyance path 0317 reaches a predetermined position. The scanned image is transmitted to the inspection apparatus 0108 via the inspection apparatus I/F 0215 and the inspection unit I/F 0231. The CPU 0226 determines whether the received image includes a defect, and notifies the inspection unit 0106 of a determination result via the inspection unit I/F 0231 and the inspection apparatus I/F 0215 again. The CPU 0216 notifies the large-capacity stacker 0107 of the received determination result via the accessory I/Fs 0214 and 0220.

The large-capacity stacker 0107 is a large-capacity stacker on which many sheets can be stacked. The large-capacity stacker 0107 includes a main tray 0324 as a tray on which sheets are stacked. A sheet having passed through the inspection unit 0106 enters the large-capacity stacker 0107 through a sheet conveyance path 0319. The sheet is stacked on the main tray 0324 from the sheet conveyance path 0319 via a sheet conveyance path 0322. The large-capacity stacker 0107 further includes a top tray 0320 as a paper discharge tray. The CPU 0221 discharges a sheet from which a defect has been detected by the inspection apparatus 0108, to the top tray 0320. In a case where a sheet is output to the top tray 0320, the sheet is conveyed from the sheet conveyance path 0319 to the top tray 0320 via a sheet conveyance path 0321. A reversing unit 0323 is a reversing unit for reversing sheets. The reversing unit 0323 is used in a case where a sheet is stacked on the main tray 0324. In the case where a sheet is stacked on the main tray 0324, the sheet is once reversed by the reversing unit 0323, so that the orientation of the paper when loaded is in the order of the number of printed pages. In a case where a sheet is conveyed to the top tray 0320, the sheet is directly discharged without being flipped at the time of stacking, and thus a reversing operation is not performed by the reversing unit 0323.

FIG. 4A illustrates a setting screen of an operation mode in the inspection apparatus 0108. An operation mode setting screen 0401 is displayed on the display unit 0245 of the inspection apparatus 0108, and receives an operation mode setting made by the user. When a "log mode" is selected in an operation mode selection unit 0402, the printing apparatus 0101 discharges all inspected sheets to a paper discharge destination preliminarily designated in a property of a print job, irrespective of an inspection result obtained by the inspection apparatus 0108. The inspection result obtained by the inspection apparatus 0108 is provided to the user as a log. When a "purge mode" is selected in the operation mode selection unit 0402, the printing apparatus 0101 discharges a sheet having passed an inspection to a preliminarily-designated paper discharge destination, and discharges a sheet having failed the inspection to the top tray 0320.

FIG. 4B illustrates a recovery setting screen of the purge mode in the inspection apparatus 0108. In a case where the "purge mode" is selected in the operation mode selection unit 0402, a recovery mode setting on a recovery mode setting screen 0403 is further reflected. The recovery mode setting screen 0403 is displayed on the display unit 0245, and receives a recovery mode setting made by the user. In a case where a "no-recovery mode" is selected on the recovery mode setting screen 0403, the printing apparatus 0101 discharges only a sheet having failed the inspection to the top tray 0320. Even if there is the sheet having failed the inspection, the printing apparatus 0101 does not stop printing, and the inspection apparatus 0108 continues to inspect a succeeding sheet.

In a case where a "recovery mode" is selected on the recovery mode setting screen 0403, the printing apparatus 0101 discharges a sheet having failed the inspection and all succeeding fed sheets existing in the apparatus at the time point at which the inspection apparatus 0108 determines that the inspection has failed, to the top tray 0320. After that, if a sheet becomes nonexistent on a sheet conveyance path, the printing apparatus 0101 and the inspection apparatus 0108 restart printing and inspection from an image to be printed on the sheet having failed the inspection.

The inspection apparatus 0108 according to the present exemplary embodiment executes inspection by capturing an image using the CISs 0315 and 0316 of the inspection unit 0106 while executing printing in the printing apparatus 0101. Thus, when the inspection apparatus 0108 determines that a certain sheet has failed the inspection, a succeeding sheet might have already reached the sheet conveyance path 0309 or 0311. Nevertheless, unless all sheets on sheet conveyance paths are discharged, an image printed on the sheet having failed the inspection cannot be printed again, and sheets cannot be stacked in a correct output order onto a paper discharge destination preliminarily designated in a print job. For this reason, in the "recovery mode", the above-described operation is executed.

The CPU 0226 notifies, via the inspection unit I/F 0231 and the inspection apparatus I/F 0215, the inspection unit 0106 of an operation mode, a recovery mode, and an inspection method that have been set in the operation mode selection unit 0402, on the recovery mode setting screen 0403, and in an inspection method selection unit 1005. The operation mode, the recovery mode, and the inspection method that have been set in the operation mode selection unit 0402, on the recovery mode setting screen 0403, and in the inspection method selection unit 1005 are stored by the CPU 0226 into the RAM 0227 and stored by the CPU 0216 into the RAM 0217.

FIG. 5 illustrates an inspection status screen to be displayed on the display unit 0245 at the time of inspection execution.

An inspection status screen 0501 is displayed on the display unit 0245, and receives an inspection execution/stop instruction and displays an inspection status. An inspection button 0502 receives an inspection execution instruction and an inspection stop instruction issued by the user. If the inspection button 0502 is pressed, a character string on the button changes to "stop inspection", and an inspection status 0503 changes to "under inspection". If the inspection button 0502 is pressed once again, the character string on the button changes to "start inspection", and the inspection status 0503 changes to "suspended". Subsequently, the character string on the inspection button 0502 and the inspection status 0503 change in a toggle manner each time the inspection button 0502 is pressed.

The inspection status screen 0501 displays, in real time during inspection, the number of inspected sheets, the number of sheets having failed the inspection, a percent defective, and the number of defects causing an inspection failure. The number displayed as an "error" on the inspection status screen 0501 is the number of images determined by the inspection apparatus 0108 to be an error due to timeout because the inspection is not completed within a predetermined inspection time and determined as being equivalent to an inspection failure. In an inspection failure list 0504, each time an inspection failure occurs, a sheet number of a sheet determined as having failed in the inspection, information indicating whether the inspection failure has occurred on the front or back surface, the cause of the inspection failure, an inspection date and time, and a hyperlink to a failure detailed screen (not illustrated) are added.

If a hyperlink of "details" is pressed, the display unit 0245 displays the failure detailed screen on which the user can view a captured image having failed the inspection, the position of a defect, and the like. In FIG. 5, causes of an inspection failure are exemplified such as a positional shift, a circular defect (spot), and a streaky defect (streak). When a scan image and a reference image are compared, a defect in which the entire or a part of the image is wholly shifted is a positional shift, and a state in which a stain is circularly generated only in the scan image is a circular defect. In addition, a state in which a stain is generated in a streak or line form only in the scan image is a streaky defect.

In this manner, the inspection apparatus 0108 can identify the type of detected defect based on the feature of the defect and display the identified type in the inspection failure list 0504. The above-described types are examples, and the types of defect that can be detected by the inspection apparatus 0108 are not limited thereto. For example, when there is a state in which an image is drawn only in the reference image and all or a part of the image is not drawn in the scan image, the inspection apparatus 0108 may determine that a missing image has occurred and add the defect to the inspection failure list 0504.

Hereinafter, characteristic processing of the present exemplary embodiment will be described with reference to a flowchart. A program of the printing apparatus 0101 related to the flowchart is stored in the storage unit 0205 of the printing apparatus 0101, loaded into the RAM 0202, and executed by the CPU 0201. A program of the inspection apparatus 0108 related to the flowchart is stored in the storage unit 0228 of the inspection apparatus 0108, loaded into the RAM 0227, and executed by the CPU 0226. A program of the information processing apparatus 0109 related to the flowchart is stored in the storage unit 0236 of the information processing apparatus 0109, loaded into the RAM 0235, and executed by the CPU 0234. A program of the client computer 0110 related to the flowchart is stored in the storage unit 0244 of the client computer 0110, loaded into the RAM 0242, and executed by the CPU 0243.

FIG. 6 is a flowchart illustrating an operation to be performed by the inspection apparatus 0108 when a reference image for inspection is registered.

A generation method of a reference image varies between two inspection methods, namely scan inspection and RIP inspection. The generation method of a reference image in each method will be described.

Figure 10:
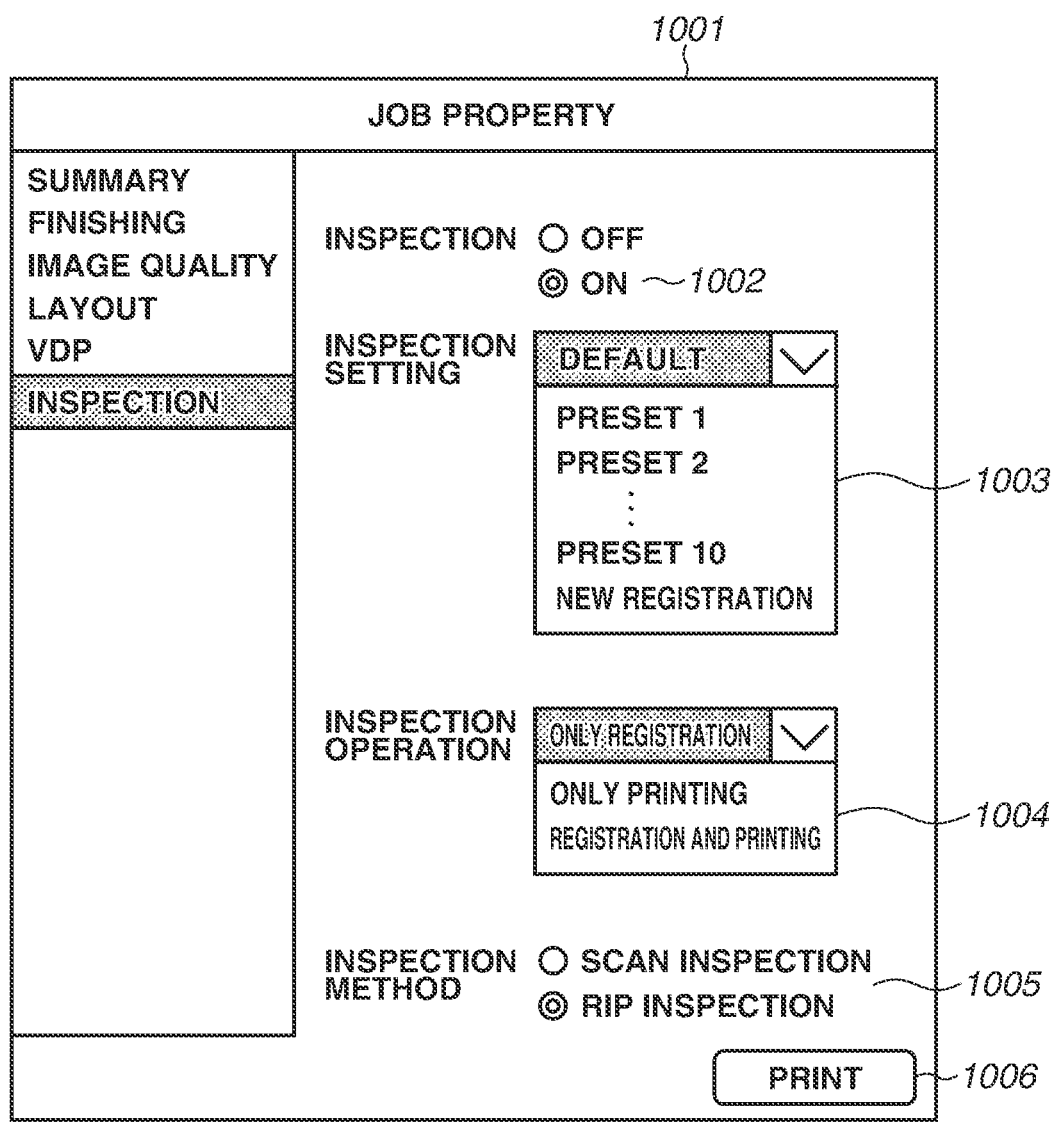
FIG. 10 illustrates a screen of a print setting to be displayed on the information processing apparatus.

In a case where an inspection method selected in the inspection method selection unit 1005 to be described with reference to FIG. 10 is the scan inspection, the printing apparatus 0101 initially prints a print job to be inspected. A printed matter that is a sheet printed by the printing apparatus 0101 is subjected to image capturing executed by the inspection unit 0106 to obtain image data.

The printing apparatus 0101 transmits the image data to the inspection apparatus 0108. The user confirms that the image data (image) displayed on the inspection apparatus 0108 does not include a stain or a mistake in characters, and registers the image data as a reference image. In the above-described manner, the reference image registration method in the scan inspection registers image data obtained by scanning of a printed matter in the inspection apparatus 0108 as the reference image. A plurality of images can be printed by the printing apparatus 0101, a plurality of captured images can be transmitted to the inspection apparatus 0108, and an image obtained by combining the plurality of captured images can also be used as the reference image.

In a case where an inspection method selected in the inspection method selection unit 1005 to be described with reference to FIG. 10 is the RIP inspection, the printing apparatus 0101 transmits a generated RIP image to the inspection apparatus 0108. At this time, the RIP image may be a RIP image generated by a RIP apparatus (for example, RIP software, etc.) other than the printing apparatus. In the above-described manner, the reference image registration method in the RIP inspection registers a RIP image into the inspection apparatus 0108 as the reference image.

The flowchart in FIG. 6 illustrates a procedure common to the scan inspection and the RIP inspection.

In step S601, the inspection apparatus 0108 receives a start notification of a reference image registration job from the printing apparatus 0101. Next, the processing proceeds to step S602. The processing is repeated until reference images of all sheets are stored in the storage unit 0228 of the inspection apparatus 0108.

In step S603, in a case where the inspection method is the scan inspection, the inspection unit I/F 0231 receives an image scanned using the CISs 0315 and 0316, from the inspection apparatus I/F 0215. In a case where the inspection method is the RIP inspection, the inspection unit I/F 0231 receives a RIP image generated by the printing apparatus 0101 before printing, from the inspection apparatus I/F 0215. Operations to be performed by the information processing apparatus 0109 and the printing apparatus 0101 using the two inspection methods, namely the scan inspection and the RIP inspection, will be described with reference to FIG. 8. The inspection method is the method selected in the inspection method selection unit 1005 to be described with reference to FIG. 10.

Next, in step S604, the CPU 0226 registers the image received in step S603 in the RAM 0227 as the reference image. Then, the processing proceeds to step S605. The processing in steps S602 to S605 is repeated until image reading of all sheets ends.

If the image reading of all sheets ends, the flowchart ends. In a case where the inspection method is the scan inspection, for example, the inspection apparatus 0108 may read a plurality of images from the same page, and register a combined image of the plurality of images as the reference image.

Figure 7:
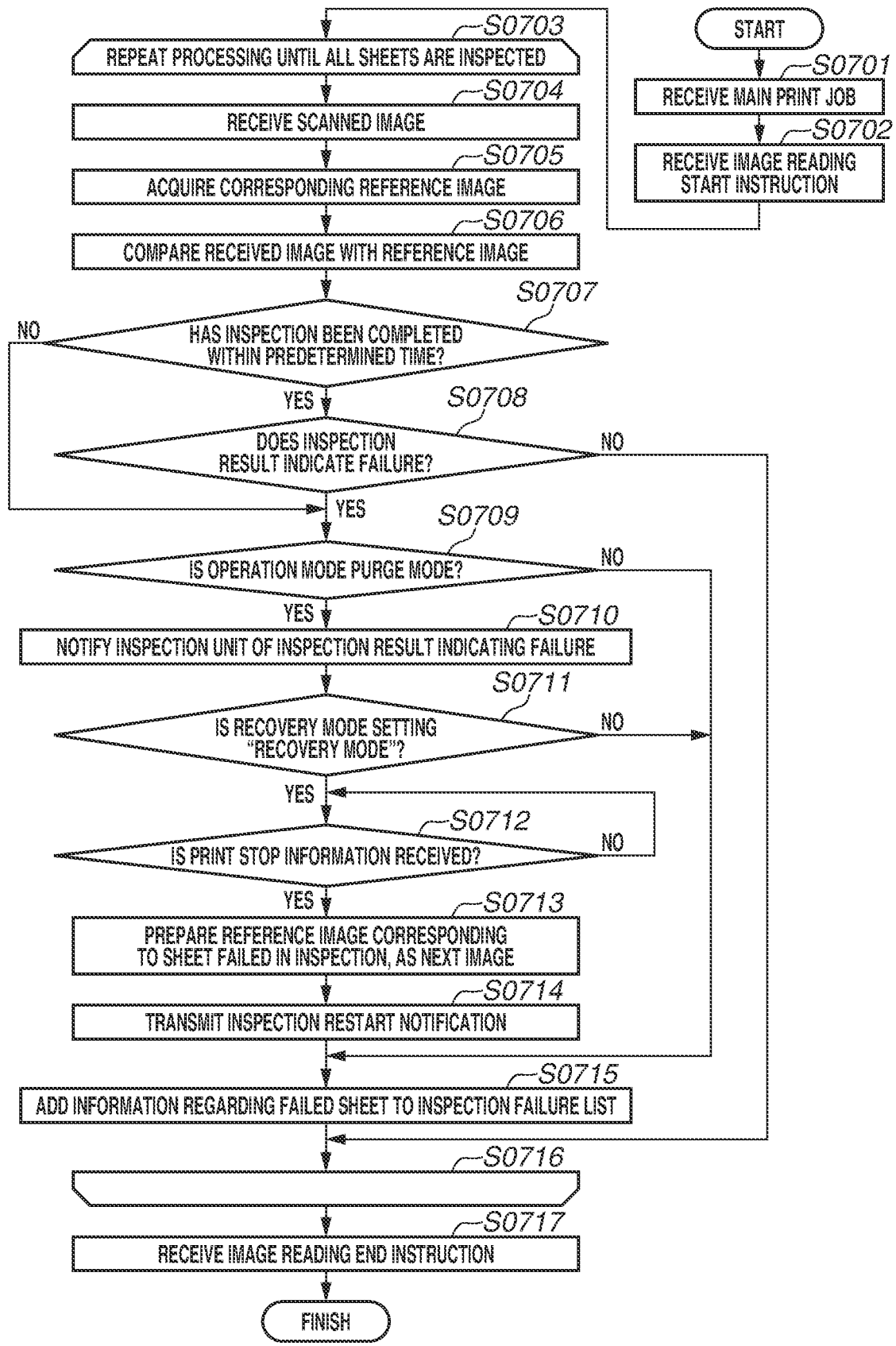
FIG. 7 is a flowchart illustrating an inspection operation to be performed by the inspection apparatus according to an exemplary embodiment.

FIG. 7 is a flowchart illustrating an inspection operation to be performed by the inspection apparatus 0108. The flowchart is started from a step in which the printing apparatus 0101 and the inspection apparatus 0108 receive a main print job from the information processing apparatus 0109.

Before the start of a job, the CPU 0226 receives an operation mode setting in the operation mode selection unit 0402 on the setting screen illustrated in FIG. 4A, and a recovery mode setting in the recovery mode setting screen 0403 illustrated in FIG. 4B. The main print job is generated by the client computer 0110 receiving a setting of the inspection method from the user via the inspection method selection unit 1005 on a job property setting screen 1001. The transmission of the main print job will be described below with reference to FIG. 8.

In step S0701, the printing apparatus 0101 receives a main print job. When the printing apparatus 0101 receives the main print job, the printing apparatus 0101 transmits information necessary for inspection that is included in the main print job, to the inspection apparatus 0108. The transmission to the inspection apparatus 0108 may be performed directly from the information processing apparatus 0109.

Next, in step S0702, the CPU 0226 receives an image reading start instruction of the main print job. It is assumed that the image reading start instruction is received from the user via a screen (not illustrated) displayed on the display unit 0245. Next, the processing proceeds to step S0703. In a case where there is a sheet to be inspected, the processing proceeds to step S0704.

In step S0704, the inspection unit I/F 0231 receives an image scanned using the CISs 0315 and 0316 from the inspection apparatus I/F 0215. The image is an image obtained by scanning of a printing result of the main print job, which serves as a deliverable.

In step S0705, the CPU 0226 reads, from the RAM 0227, a reference image of a corresponding page that has been registered in step S604.

Next, in step S0706, the CPU 0226 compares the reference image read in step S0705 and the scan image to be inspected that has been received in step S0704. In an operation of comparison, first, image positions of the reference image and the scan image to be inspected are aligned using a characteristic point in the images as a reference point for positioning. Next, in the scan image to be inspected, by an analysis of four corners of a sheet and the reference point for positioning of the scan image, it is detected whether there is a positional shift of the image with respect to the sheet.

Next, the CPU 0226 compares, for each pixel, density values of the reference image and the scan image to be inspected. As a result of the above-described comparison, if a difference between the scan image and the reference image is not detected, the inspection is determined as having succeeded. In a case where a difference is detected, the inspection is determined as having failed. The details of the inspection failure, which have been described with reference to FIG. 5, are recorded depending on the type of defect. To describe a basic inspection operation, the processing that always determines an inspection result to be a failure in a case where a difference is detected has been described. In the present exemplary embodiment, processing of selecting a desirable reference image in the case where a difference is detected is discussed. The processing will be described with reference to the flowchart in FIG. 8.

Next, in step S0707, it is determined whether the inspection has been completed within a predetermined time. In a case where the inspection has been completed within the predetermined time (YES in step S0707), the processing proceeds to step S0708. In a case where the inspection has not been completed within the predetermined time (NO in step S0707), the processing proceeds to step S0709. Because the inspection method of the present exemplary embodiment has a configuration of executing inspection depending on a speed of printing, an inspection time taken to inspect one scan image is limited. This is because, unless an inspection is completed and an inspection result is output within a certain period of time, a next inspection for inspecting the next scanned image may not be in time. When the purge mode is selected in the operation mode selection unit 0402, the CPU 0221 switches a conveyance destination in such a manner as to discharge a sheet determined by the inspection apparatus 0108 as having failed the inspection to the top tray 0320.

Thus, the inspection time is limited because, unless the inspection ends within a time limit, it becomes too late for switching of the conveyance destination. Before a sheet reaches a point at which the conveyance destination becomes is non-switchable, the CPU 0226 needs to notify the CPU 0221 of an inspection failure via the inspection unit I/F 0231, the inspection apparatus I/F 0215, the accessory I/F 0214, and the accessory I/F 0220.

Accordingly, in the case where the inspection has failed to be completed within the predetermined time (NO in step S0707), because the inspection cannot be determined as having succeeded, the CPU 0226 determines that an inspection result indicates an error, and determines an inspection result of the sheet to be a result equivalent to an inspection result indicating a failure.

In step S0708, the CPU 0226 determines whether an inspection result indicates a failure. If the inspection result indicates a failure (YES in step S0708), the processing proceeds to step S0709. In step S0709, the CPU 0226 reads an operation mode from the RAM 0227, and determines whether the operation mode is the purge mode. If the operation mode is the purge mode (YES in step S0709), the processing proceeds to step S0710. In step S0710, the CPU 0226 notifies the CPU 0216 of the inspection result indicating a failure via the inspection unit I/F 0231 and the inspection apparatus I/F 0215.

Next, the processing proceeds to step S0711. In step S0711, the CPU 0216 determines whether a recovery mode setting read by the CPU 0226 from the RAM 0227 is the "recovery mode". If the recovery mode setting read by the CPU 0226 from the RAM 0227 is the "recovery mode" (YES in step S0711), the processing proceeds to step S0712. In step S0712, the CPU 0226 waits until print stop information is received from the CPU 0216 via the inspection unit I/F 0231 and the inspection apparatus I/F 0215. If the CPU 0226 has received the print stop information, the processing proceeds to step S0713.

In step S0713, the CPU 0226 reads the reference image corresponding to the sheet determined as having failed the inspection, from the RAM 0227, and stores the reference image as an image to be inspected next. Next, the processing proceeds to step S0714. In step S0714, the CPU 0226 notifies the CPU 0216 of a resumption of inspection via the inspection unit I/F 0231 and the inspection apparatus I/F 0215.

Next, the processing proceeds to step S0715. In step S0715, the CPU 0226 adds information regarding the sheet determined as having failed the inspection to the inspection failure list 0504. Next, the processing proceeds to step S0716. The processing in steps S0703 to S0716 is repeated until the inspection of all sheets ends. If the inspection of all sheets ends, the processing proceeds to step S0717. In step S0717, the CPU 0226 receives an image reading end instruction from the user via the inspection button 0502 displayed on the display unit 0245.

If it is determined in step S0711 that the recovery mode setting read by the CPU 0226 from the RAM 0227 is the "no-recovery mode" (NO in step S0711), the processing proceeds to step S0715, and subsequently, the processing can be ended similarly to the above-described procedure. If it is determined in step S0709 that the operation mode is the log mode (NO in step S0709), the processing proceeds to step S0715, and subsequently, the processing can be ended similarly to the above-described procedure.

Furthermore, if it is determined in step S0708 that the inspection result indicates a success (NO in step S0708), the processing proceeds to step S0716, and subsequently, the processing can be ended similarly to the above-described procedure.

The example described in this flowchart is an example. For example, an image reading start instruction issued by the user on the display unit 0245 may be automatically issued in synchronization with a printing start instruction issued on the printing apparatus 0101, the information processing apparatus 0109, or the client computer 0110, and a configuration thereof is not limited. An image reading end instruction issued by the user on the display unit 0245 may be automatically issued in synchronization with a printing end instruction issued on the printing apparatus 0101, and a configuration thereof is not limited.

An operation to be performed during inspection job execution that is discussed in the present exemplary embodiment will be described. A procedure of processing an inspection job by the information processing apparatus 0109, the inspection apparatus 0108, and the printing apparatus 0101 in cooperation with each other will be described with reference to FIGS. 8 to 11A to 11C.

First, a selection operation of an inspection method of an inspection job will be described with reference to FIG. 10.

The operation to be described with reference to FIG. 10 is an operation to be performed before reference image registration is started. FIG. 10 illustrates an example of a job property setting screen. The job property setting screen (inspection method selection unit) 1001 is a screen to be displayed on the client computer 0110. If an "inspection" tab is selected from among tabs on the left side of the job property setting screen 1001, a job setting regarding inspection can be made, and a print job setting regarding the inspection is received from the user. A print job generated in the client computer 0110 includes a received job setting, and the print job is transmitted from the client computer 0110 to the printing apparatus 0101 via the information processing apparatus 0109. The print job is managed in the information processing apparatus 0109.

In a case where the user selects inspection "On" in an inspection mode setting unit 1002, a subsequent property setting is made. The print job for which the inspection "On" is set will be referred to as an "inspection job".

In a case where the inspection "Off" is selected, for example, an inspection setting unit 1003, an inspection operation setting unit 1004, and the inspection method selection unit 1005 may be grayed out and the selection by the user may be made unreceivable. If a Print button 1006 is pressed in a state in which the inspection "Off" is selected, the printing apparatus 0101 performs a normal printing operation.

In the inspection setting unit 1003, a region to be inspected and a setting method of an inspection level are selected. If "Default" is selected, the inspection apparatus 0108 inspects the entire region of a reference image at a standard level. If any of "Preset 1" to "Preset 10" is selected, the inspection apparatus 0108 performs inspection based on a region and a level that are preliminarily-designated for the reference image. The inspection settings "Preset 1" to "Preset 10" are stored in the storage unit 0228, and if the Print button 1006 is pressed, the CPU 0226 reflects an inspection setting in the reference image. If "New registration" is selected, the inspection apparatus 0108 receives, from the user, a region to be newly inspected and an inspection setting of a level of the inspection, and performs the inspection based on the received region and the level. If the inspection apparatus 0108 receives a print job for which "New registration" is set in the inspection setting, the inspection apparatus 0108 displays a reference image received on the display unit 0245 within an inspection setting screen 1101 displayed on the display unit 0245. The inspection setting screen 1101 will be described below with reference to FIGS. 11A to 11C.

If "Default" or any of "Preset 1" to "Preset 10" is selected in the inspection setting unit 1003 and the Print button 1006 is pressed, the inspection apparatus 0108 is configured not to display the inspection setting screen 1101. If the Print button 1006 on the job property setting screen 1001 is pressed by a user operation and the reception of a reference image is completed, the inspection apparatus 0108 performs the registration of the reference image without performing another addition operation. In the present exemplary embodiment, when "Default" or any of "Preset 1" to "Preset 10" is selected in the inspection setting unit 1003 and the Print button 1006 is pressed, the inspection apparatus 0108 is configured not to display the inspection setting screen 1101. Alternatively, the inspection apparatus 0108 may be configured to display the inspection setting screen 1101. The purpose of displaying the inspection setting screen 1101 in this case is to check an automatically-set inspection setting by the user.

In the inspection operation setting unit 1004, a combination of operations such as registration of a reference image and printing of a main print job is selected. When "only registration" is selected, the inspection apparatus 0108 performs only the registration of a reference image and an inspection setting of the reference image. When "only printing" is selected, printing is performed by the printing apparatus 0101 using a pre-registered reference image, and inspection is performed by the inspection apparatus 0108. In a case where "only printing" is selected in the inspection operation setting unit 1004, the inspection mode setting unit 1002 is grayed out, and input from the user is not received. If "registration and printing" is selected, the above-described operation of "only registration" and the operation of "only printing" are successively performed.

When "scan inspection" is selected in the inspection method selection unit 1005, the inspection apparatus 0108 sets a scan image of a printed matter as the reference image to be used in inspection. When "RIP inspection" is selected, the inspection apparatus 0108 sets a RIP image to be used by the printing apparatus 0101 in printing as the reference image. The generation processing and storage processing of the reference image have been described above with reference to the flowchart in FIG. 6.

Lastly, if the Print button 1006 is pressed, printing and inspection operations are executed based on the settings input via the inspection mode setting unit 1002, the inspection setting unit 1003, the inspection operation setting unit 1004, and the inspection method selection unit 1005. Details of the printing and inspection operations to be performed based on the settings will be described with reference to FIGS. 8 and 9.

Subsequently, an inspection setting screen to be displayed by the inspection apparatus 0108 and the overview of a user operation will be described with reference to FIGS. 11A to 11C. The inspection setting screen 1101 is an example of an inspection setting screen to be displayed by the inspection apparatus 0108 for the user. If a reference image registration job is transmitted in step S802 of FIG. 8, the inspection setting screen 1101 is displayed on the display unit 0245 included in the inspection apparatus 0108, and a user operation is received.

Figure 11A:
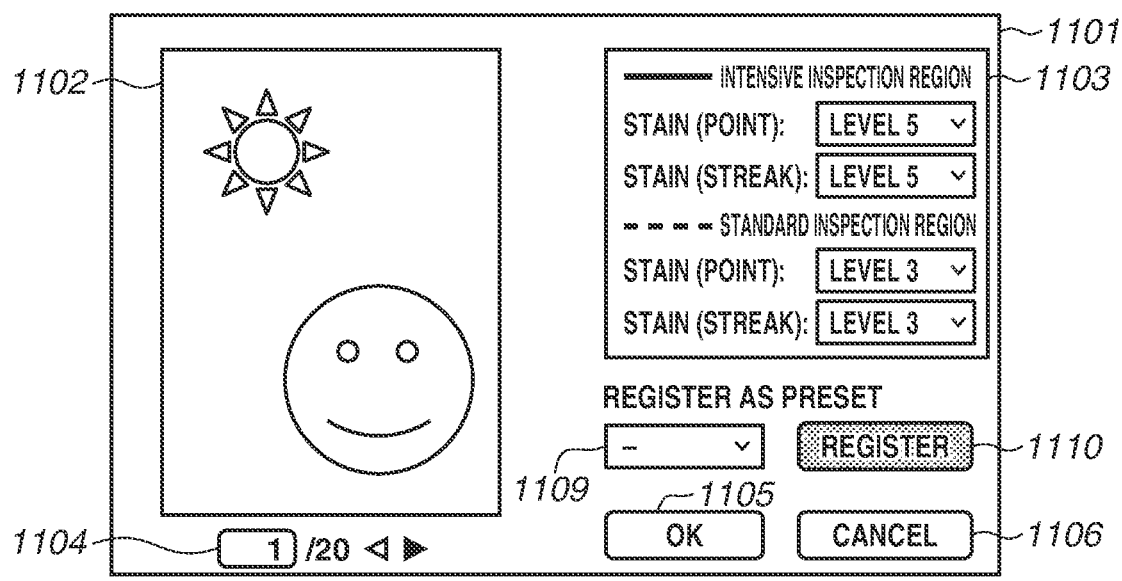
FIGS. 11A, 11B, and 11C illustrate inspection setting screens to be displayed on the inspection apparatus.
Figure 11B:
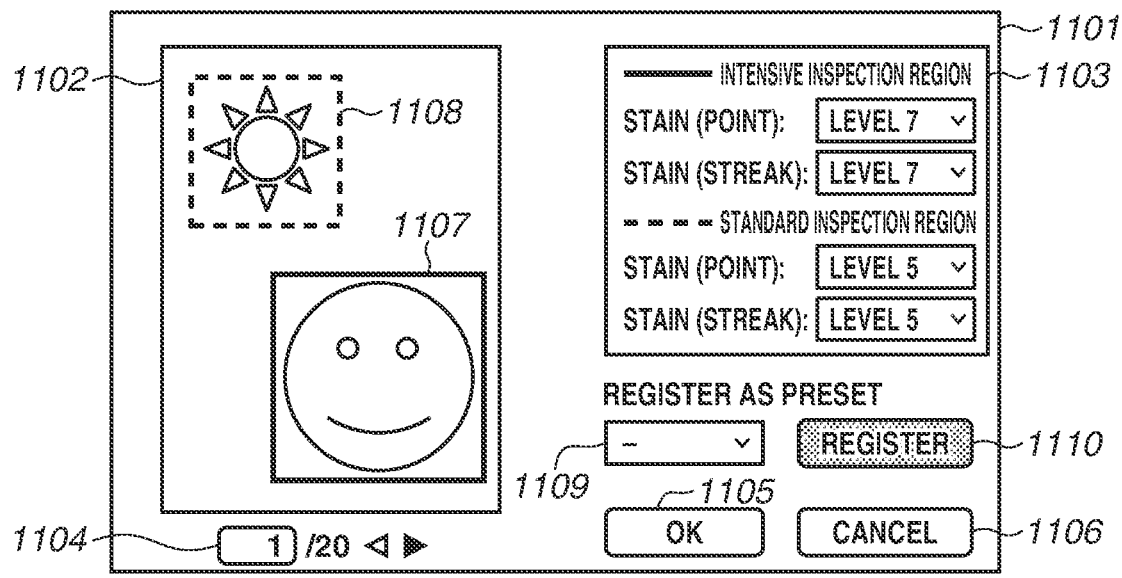
Figure 11C:
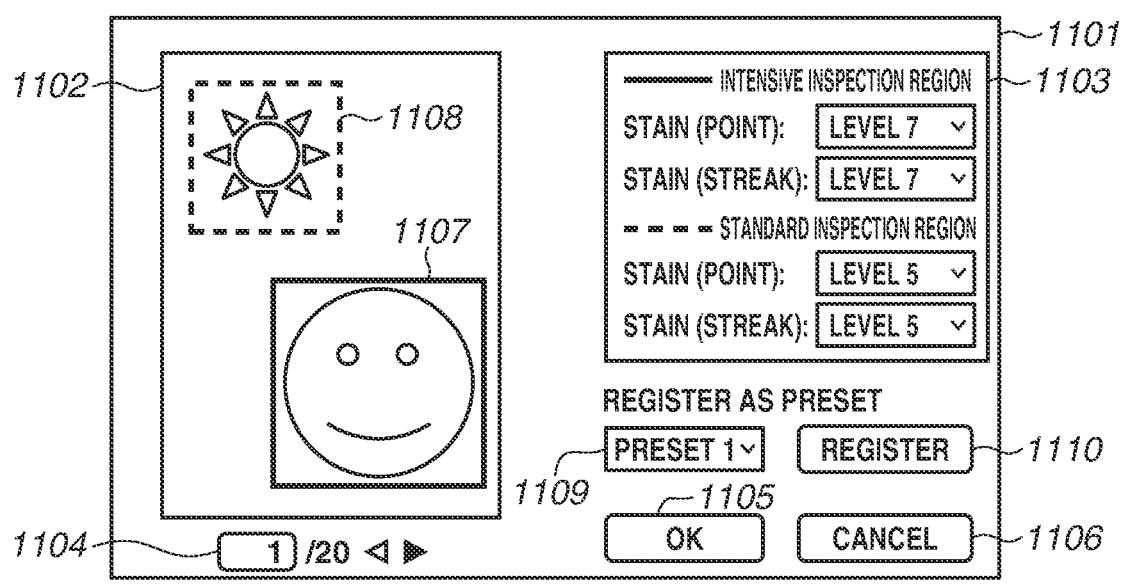

FIG. 11A illustrates an example of the inspection setting screen to be displayed before an operation is received from the user. The reference image generated in step S604 of FIG. 6 is displayed in a preview region 1102. In an inspection region setting unit 1103, an inspection level (i.e., inspection accuracy) for each inspection region can be changed. The higher the inspection level is set, the slighter a difference between the reference image and a printed matter determined by the inspection apparatus 0108 as a defect becomes.

The level of a defect to be detected can be changed depending on the type of inspection region such as an intensive inspection region and a standard inspection region. Aside from the examples given here, an inspection excluded region in which inspection is not performed may be added as a type of region. It is general to set a higher inspection level to the intensive inspection region than to the standard inspection region, but the setting is not limited.

Defects herein are exemplified such as a circular defect (stain (point)) and a streaky defect (stain (streak)). When a reference image and a scan image of a printed matter are compared, a state in which a stain is circularly generated only in the scan image of the printed matter corresponds to the circular defect, and a state in which a stain is generated in a streaky or a linear shape only in the scan image of the printed matter corresponds to the streaky defect. Because these defects are examples, the types of defects that can be detected by the inspection apparatus 0108 are not limited to these.

In FIG. 11A illustrating a state before the user performs an operation, the inspection levels of the stain (point) and stain (streak) in the intensive inspection region and the standard inspection region are default inspection levels stored by the inspection apparatus 0108. In the example illustrated in FIG. 11A, the default inspection level for the intensive inspection region is level 5 and the default inspection level for the standard inspection region is level 3.

A page number display unit 1104 is used to switch an image to be displayed in a case where there is a plurality of reference images. An OK button 1105 is a button for registering a region set in the reference image. A cancel button 1106 is a button for issuing a stop instruction of an inspection job. The buttons are objects displayed on the screen. A Preset number selection unit 1109 and a Preset registration button 1110 will be described in detail with reference to FIG. 11C.

An example of a user operation and reflection of the operation in the inspection setting screen will be described with reference to FIG. 11B.

By selecting the type of inspection region in the inspection region setting unit 1103 and designating a region in the preview region 1102, the inspection apparatus 0108 performs inspection of the designated region. A region designation method includes input made by a mouse cursor, for example, and an input format thereof is not limited.

The user can also change the inspection level in the inspection region setting unit 1103. The example in FIG. 11B illustrates that the inspection level for the intensive inspection region is set to level 7 and the inspection level for the standard inspection region is set to level 5.

An example of region designation will be described using regions 1107 and 1108. In the example indicates a case where the region 1107 is set as the intensive inspection region and the region 1108 is set as the standard inspection region. As illustrated in FIGS. 11B and 11C, a solid line indicates the intensive inspection region and a broken line indicates the standard inspection region. Alternatively, the types of regions may be made distinguishable by color or background color. The regions do not have to be designated on a page that does not need to be inspected. Alternatively, the entire page may be designated as the region without finely separating a range. An image to be displayed can be switched using the page number display unit 1104, and thus the inspection region can be set on all pages.

In a case where the OK button 1105 is selected after the completion of inspection region designation, the CPU 0226 transmits an inspection setting completion notification to the information processing apparatus 0109. In a case where the cancel button 1106 is selected, the inspection apparatus 0108 closes the inspection setting screen 1101 without performing the registration of the inspection setting.

The information processing apparatus 0109 can execute a main print job for an inspection job for which the inspection setting completion notification has been received. As described in "BACKGROUND OF THE INVENTION", there are two types of operation methods of an inspection job, and the user can perform the registration of a reference image and main printing at a desired timing depending on a use case. A method of executing a job for which the inspection setting is predetermined is defined as a workflow A, and a method of determining the inspection setting after executing a job is defined as a workflow B. An operation in a conventional inspection apparatus will be described in detail below.

In the workflow A, the user executes only a main print job of an inspection job for which the reference image is registered. The user issues an execution instruction of the main print job on the client computer 0110 (first step), and the printing apparatus 0101 performs printing, image capturing of a printed matter, and transmission of a captured image to the inspection apparatus 0108. The inspection apparatus 0108 performs inspection by comparing the captured image of the printed matter with the reference image already-registered in the inspection apparatus 0108. However, the configuration is not limited thereto, and the execution instruction of the main print job may be issued on the information processing apparatus 0109. At this time, the operation of the user is performed in one step.

In the workflow B, the user executes an inspection job, makes an inspection setting, and executes a main print job. First, the user issues an execution instruction of the inspection job on the client computer 0110 (step 1). Subsequently, the user sets an inspection condition on the inspection apparatus 0108 (step 2), and lastly, issues an execution instruction of the main print job from the client computer 0110 (step 3). The inspection job is completed in the above-described three steps in total. The user can set the inspection condition while viewing the reference image on the inspection setting screen displayed on the inspection apparatus 0108. However, the configuration is not limited thereto, and the execution instructions of the inspection job and the main print job may be issued on the information processing apparatus 0109.

Next, an operation to be performed in setting registration of Preset will be described with reference to FIG. 11C. Preset is an inspection setting to be used when inspection is performed using an inspection region and an inspection level that are pre-registered by the user. A Preset inspection setting can be registered when "new registration" is selected in the inspection setting unit 1003. A configuration of registering an inspection region and an inspection level without designating a reference image, or a configuration of prestoring an inspection region and an inspection level in the inspection apparatus 0108 without input from the user may be employed. The Preset registration method illustrated in FIG. 11C is an example, and the registration method is not limited thereto.

A Preset registration operation will be described with reference to FIG. 11C. When the user selects "new registration" in the inspection setting unit 1003, aside from the inspection setting described with reference to FIGS. 11A and 11B, inspection settings can be registered in the inspection apparatus 0108 as "Preset 1" to "Preset 10".

If the user selects a number to be registered as Preset in the Preset number selection unit 1109, the Preset registration button 1110 becomes selectable. Until any Preset number is selected in the Preset number selection unit 1109, the Preset registration button 1110 is grayed out, and the user cannot select the Preset registration button 1110 (FIGS. 11A and 11B).

If the user presses the Preset registration button 1110, a currently-set inspection region and an inspection level are stored in the storage unit 0228. When an already-registered Preset number is selected in the Preset number selection unit 1109, and the Preset registration button 1110 is pressed, an inspection setting stored in the storage unit 0228 is overwritten. At this time, a configuration of prompting the user to input determination on whether to overwrite Preset may be employed.

Figure 8:
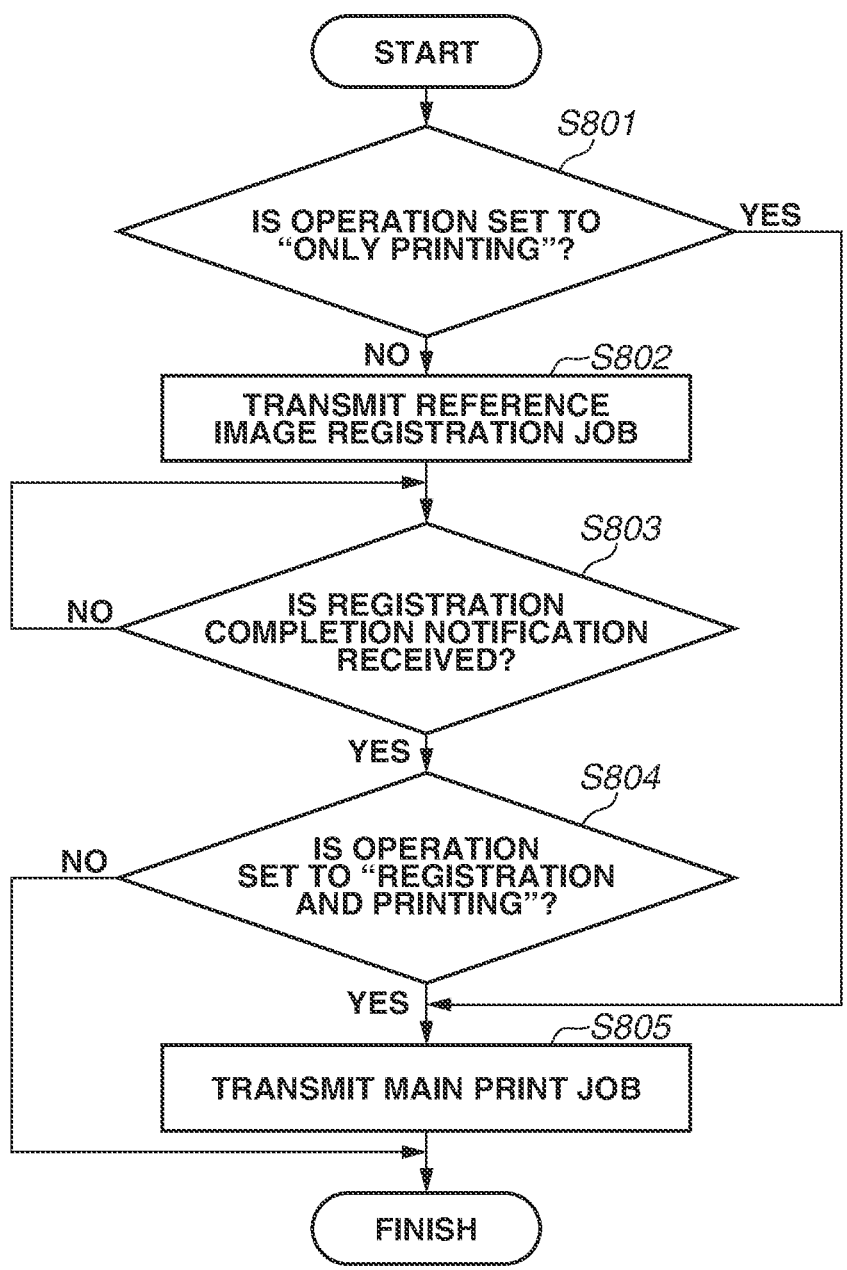
FIG. 8 is a flowchart illustrating an inspection operation to be performed by the information processing apparatus according to an exemplary embodiment.

Subsequently, an operation to be performed when the information processing apparatus 0109 executes an inspection job will be described with reference to the flowchart in FIG. 8.

If the user executes a print job for which the inspection is set to "On" in the inspection mode setting unit 1002, in step S801, the CPU 0234 determines whether an operation set in the inspection operation setting unit 1004 is "only printing". In a case where a setting in the inspection operation setting unit 1004 is "only registration" or "registration and printing" (NO in step S801), the processing proceeds to step S802. In a case where the setting in the inspection operation setting unit 1004 is "only printing" (YES in step S801), the processing proceeds to step S805. Next, in step S802, the information processing apparatus 0109 transmits a reference image registration job to the printing apparatus 0101, and the processing proceeds to step S803.

The reference image registration job is a print job in which one or a plural number is set as the number of copies when "scan inspection" is selected in the inspection method selection unit 1005. The information processing apparatus 0109 transmits a print job in which the number of copies is one to the printing apparatus 0101, and the printing apparatus 0101 performs a printing operation and image capturing, and then, transmits the captured image to the inspection apparatus 0108.

The reference image registration job is a job for registering a RIP image to be generated by the printing apparatus 0101 before printing as the reference image when "RIP inspection" is selected in the inspection method selection unit 1005. In a case where a RIP image is registered as a reference image, the printing and image capturing operations are not performed as in the scan inspection. The information processing apparatus 0109 transmits a RIP image to be used by the printing apparatus 0101 in printing to the inspection apparatus 0108.

After the reference image registration job is transmitted to the printing apparatus 0101 in step S802, as described with reference to FIGS. 11A to 11C, the inspection apparatus 0108 receives a setting of an inspection level for each inspection region in the reference image that has been made by the user. Because the inspection apparatus 0108 performs inspection by comparing the reference image and a captured image of a printed matter based on the setting, it is necessary to bring the information processing apparatus 0109 into a standby state without starting a main print job until the setting of an inspection condition ends. Thus, in step S803, the CPU 0234 stands by without transmitting the main print job to the printing apparatus 0101 until a reference image registration completion notification is received from the inspection apparatus 0108. If the CPU 0234 receives the registration completion notification, the processing proceeds to step S804. In step S804, the CPU 0234 determines whether an operation set in the inspection operation setting unit 1004 is "registration and printing". In a case where the operation set in the inspection operation setting unit 1004 is "registration and printing" (YES in step S804), the processing proceeds to step S805. In a case where the operation set in the inspection operation setting unit 1004 is "only registration" (NO in step S804), the processing ends. In step S805, the CPU 0234 transmits the main print job to the printing apparatus 0101 and ends the processing.

The main print job is transmitted through similar processing irrespective of the inspection method selected in the inspection mode setting unit 1002. If the main print job is transmitted from the information processing apparatus 0109 to the printing apparatus 0101, the printing apparatus 0101 performs a printing operation, performs image capturing of the printed sheet using the imaging unit 0218, and transmits the captured image to the inspection apparatus 0108. The inspection apparatus 0108 compares the captured image of the printed matter and the reference image, and performs inspection based on an inspection setting made on the inspection setting screen 1101.

Figure 9:
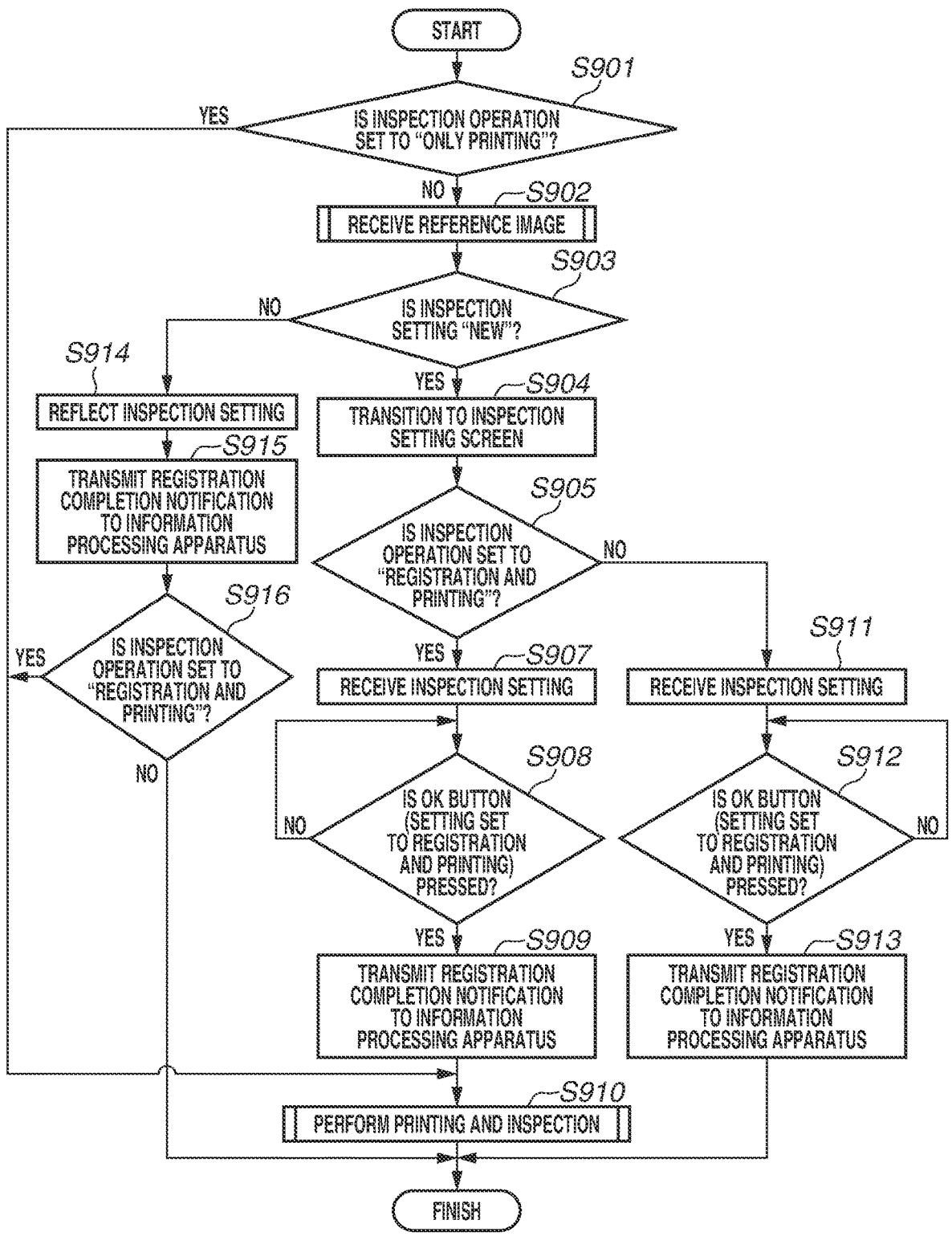
FIG. 9 is a flowchart illustrating an overall operation to be performed by the inspection apparatus according to an exemplary embodiment.

An operation to be performed when the inspection apparatus 0108 executes an inspection job will be described with reference to the flowchart in FIG. 9. In step S901, the CPU 0226 receives an inspection operation set in the inspection operation setting unit 1004, and determines whether the inspection operation is "only printing". In a case where the inspection operation is "only registration" or "registration and printing" (NO in step S901), the processing proceeds to step S902. In a case where the inspection operation is "only printing" (YES in step S901), the processing proceeds to step S910. As described above with reference to FIG. 10, in the case where the inspection operation is "only printing", a setting is not received in the inspection setting unit 1003. An inspection setting for the reference image is determined through operations to be described in steps S914 and S915 or in steps S911 to S913. In step S902, the CPU 0226 receives the reference image generated in the flowchart in FIG. 6 from the printing apparatus 0101, and stores the reference image in the storage unit 0228.

In step S903, the CPU 0226 receives an inspection setting set in the inspection setting unit 1003, and determines whether the inspection setting set in the inspection setting unit 1003 is "new". In a case where the inspection setting set in the inspection setting unit 1003 is "new" (YES in step S903), the processing proceeds to step S904. In a case where the inspection setting set in the inspection setting unit 1003 is "Default" or "Preset" (NO in step S903), the processing proceeds to step S914. In step S904, the inspection apparatus 0108 displays the inspection setting screen 1101 on the display unit 0245. In step S905, the CPU 0226 receives an inspection operation set in the inspection operation setting unit 1004, and determines whether the inspection operation set in the inspection operation setting unit 1004 is "registration and printing". In a case where the inspection operation set in the inspection operation setting unit 1004 is "registration and printing" (YES in step S905), the processing proceeds to step S907. In a case where the inspection operation set in the inspection operation setting unit 1004 is "only registration" (NO in step S905), the processing proceeds to step S911.

In a case where the processing proceeds to step S907, the information processing apparatus 0109 does not transmit a main print job to the printing apparatus 0101, and the main print job is in a suspended state (standby state) in the information processing apparatus 0109. In step S907, the CPU 0226 receives an inspection setting from the user via the display unit 0245.

In step S908, the CPU 0226 repeats the processing in step S908 until a press of the OK button 1105 is received from the user on the display unit 0245. In a case where the press is received (YES in step S908), the processing proceeds to step S909.

In addition, the CPU 0226 stores a reference image in which the inspection setting is reflected in the storage unit 0228. In a case where a press of the cancel button 1106 is received, the inspection apparatus 0108 discards the reference image received in step S902 from the storage unit 0228.

In a case where an inspection job in the standby state remains in the information processing apparatus 0109, the inspection apparatus 0108 transmits a cancel notification to the information processing apparatus 0109. And, the information processing apparatus 0109 cancels the inspection job kept in the standby state in the information processing apparatus 0109, and ends the processing.

In step S909, the CPU 0226 transmits a registration completion notification to the information processing apparatus 0109. Next, the processing proceeds to step S910.

In steps S911 to S913, the processing similar to the processing in steps S907 to S909 is performed, and then, the processing ends.

The processing in step S914 is processing to be performed when "Default" or any of "Preset 1" to "Preset 10" is selected in the inspection setting unit 1003. The setting "Default" in the inspection setting unit 1003 is an inspection setting for the inspection apparatus 0108 to designate the standard level as the inspection level of the entire region of the reference image, and the inspection setting is reflected by the CPU 0226 in the reference image. The settings "Preset 1" to "Preset 10" in the inspection setting unit 1003 are inspection settings each for the inspection apparatus 0108 to perform an inspection setting with a region and a level designated for the reference image. The inspection settings "Preset 1" to "Preset 10" are stored in the storage unit 0228 of the inspection apparatus 0108, read into the RAM 0227, and reflected by the CPU 0226 in the reference image. In the two inspection settings of "Default" and "Preset 1" to "Preset 10", the inspection setting can be completed without the input made by the user as described with reference to FIGS. 11A and 11B. In step S914, the CPU 0226 stores the reference image in which the inspection setting is reflected in the storage unit 0228. A configuration of only registering the reference image in step S914 may be employed. In this case, the input into the inspection setting unit 1003 is received when "only printing" is selected in the inspection operation setting unit 1004. The inspection apparatus 0108 reflects a setting received in the inspection setting unit 1003, in the reference image, and in step S910, performs printing using the printing apparatus 0101 and an inspection operation. Next, the processing may proceed to step S915.

In step S915, the CPU 0226 transmits a registration completion notification to the information processing apparatus 0109. Next, the processing proceeds to step S916. In step S916, the CPU 0226 determines whether the inspection operation set in the inspection operation setting unit 1004 is "registration and printing". In a case where the inspection operation set in the inspection operation setting unit 1004 is "registration and printing" (YES in step S916), the processing proceeds to step S910. In a case where the inspection operation set in the inspection operation setting unit 1004 is "only registration" (NO in step S916), the processing ends. In step S910, the CPU 0226 performs the printing processing and the inspection processing, which have been described with reference to the flowchart in FIG. 7, and then ends the processing.

Through the above-described procedure, in the workflow A, the user sets "only printing" in the inspection operation setting unit 1004 for an inspection job, and executes the inspection job by pressing the Print button 1006. The operation is thereby completed. At this time, the procedure of the operation is performed in one step, similarly to a prior art. On the other hand, in the workflow B, the user executes an inspection job for which "new registration" is set in the inspection setting unit 1003 and "registration and printing" is set in the inspection operation setting unit 1004, and makes an inspection setting. The operation is thereby completed.

The operation will be described in detail. The "registration and printing" is selected in the inspection operation setting unit 1004, and the Print button 1006 is pressed (first step). Subsequently, an inspection setting is made on the inspection setting screen 1101, and the OK button 1105 is pressed (second step). Accordingly, the registration of the inspection setting is performed by the inspection apparatus 0108, and printing and inspection are performed by the printing apparatus 0101, and the operation is completed. The procedure of the operation performed at this time includes the above-described two steps. In the first step, the information processing apparatus 0109 suspends the main print job without transmitting the main print job to the printing apparatus 0101. Because the main print job is automatically restarted (the main print job is transmitted to the printing apparatus 0101) if a reference image registration completion notification is received in step S909, an inspection job can be ended without an operation involving the user.

In this manner, according to the present exemplary embodiment, in the workflow B, it is possible to reduce the number of steps to two from three, which is the number required in the prior art, and reduce the number of operations to be performed by the user. Since a main print job is executed after the registration of a reference image ends, it is possible to restart the main print job at a timing appropriate for the user. In this manner, it is possible to bring about an effect of improvement in the operability of the user who uses an inspection apparatus.

Figure 13:
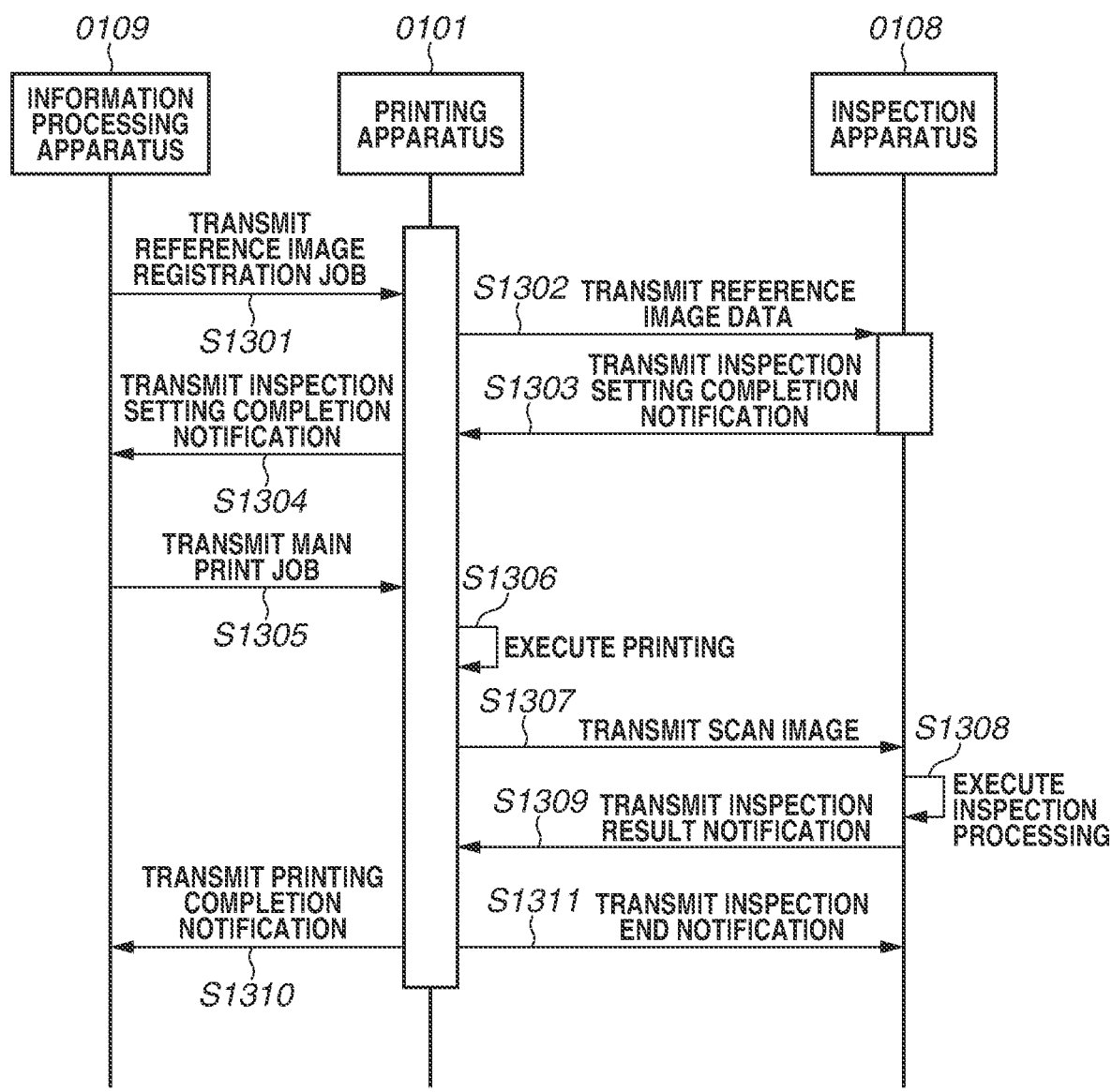
FIG. 13 illustrates another example of the inspection procedure in an inspection system.

Subsequently, a procedure from reference image registration to an inspection end that is performed in a case where the inspection setting is "new registration" and the inspection operation is "registration and printing" in FIG. 10 will be described with reference to FIGS. 12 and 13. FIG. 12 is a diagram illustrating a procedure of data exchange performed between the apparatuses according to an exemplary embodiment.

In step S1201, the information processing apparatus 0109 transmits an inspection job to the printing apparatus 0101. Jobs include a reference image registration job for performing processing of registering a reference image in an inspection apparatus, a normal job for executing printing in a printing apparatus, and a main print job for executing printing in a printing apparatus and executing inspection of a printed document in an inspection apparatus. In the present exemplary embodiment, the inspection job collectively refers to a job including both a reference image registration job and a main print job.

In step S1202, the printing apparatus 0101 that has received the inspection job including the reference image registration job from the information processing apparatus 0109 transmits reference image data to the inspection apparatus 0108. Then, the processing of registering the received reference image data is executed in the inspection apparatus 0108. After that, an inspection setting is received from the user on the reference image displayed on the inspection apparatus 0108. The reception of the inspection setting has been described with reference to FIGS. 11A to 11C. If the OK button 1105 in FIGS. 11A to 11C is pressed, the processing proceeds to step S1203.

In step S1203, the inspection apparatus 0108 transmits a registration completion notification of a reference image to the printing apparatus 0101. The registration completion notification of a reference image may be completion notification of an inspection setting. In step S1204, the printing apparatus 0101 that has received the registration completion notification of a reference image from the inspection apparatus 0108 executes printing based on the main print job received in step S1201. In step S1205, the printing apparatus 0101 transmits a scan image obtained by scanning a printed matter obtained by printing, to the inspection apparatus 0108. In step S1206, the inspection apparatus 0108 executes inspection processing. In step S1207, the inspection apparatus 0108 notifies the printing apparatus 0101 of an inspection result.

In step S1208, the printing apparatus 0101 that has received the inspection result from the inspection apparatus 0108 transmits a printing completion notification to the information processing apparatus 0109. In step S1209, the printing apparatus 0101 that has received the inspection result from the inspection apparatus 0108 transmits an inspection completion notification (inspection end notification) to the inspection apparatus 0108. The processing in steps S1208 and S1209 may be simultaneously performed being triggered by an inspection result notification from the inspection apparatus 0108, or the processing in step S1208 may be performed next to the processing in step S1209.

In FIG. 12, a reference image registration job and a main print job are transmitted at once from the information processing apparatus 0109, and if an inspection setting completion notification is received from the inspection apparatus 0108, the main print job held by the printing apparatus 0101 is started. Alternatively, the information processing apparatus 0109 may transmit a main print job to the printing apparatus 0101 if the inspection setting completion notification is received. The method will be described with reference to FIG. 13. FIG. 13 is a diagram illustrating a procedure of data exchange performed between the apparatuses using the method.

In step S1301, the information processing apparatus 0109 transmits a reference image registration job to the printing apparatus 0101.

In step S1302, the printing apparatus 0101 that has received the reference image registration job from the information processing apparatus 0109 transmits reference image data to the inspection apparatus 0108. Then, the processing of registering the received reference image data is executed in the inspection apparatus 0108. After that, an inspection setting is received from the user on the reference image displayed on the inspection apparatus 0108. The reception of the inspection setting has been described with reference to FIGS. 11A to 11C. If the OK button 1105 in FIGS. 11A to 11C is pressed, the processing proceeds to step S1303.

In step S1303, the inspection apparatus 0108 transmits a reference image setting completion notification to the printing apparatus 0101. The registration completion notification of a reference image may be completion notification of an inspection setting.

In step S1304, the printing apparatus 0101 that has received the reference image setting completion notification from the inspection apparatus 0108 transmits the reference image setting completion notification to the information processing apparatus 0109. The inspection apparatus 0108 may directly transmit the reference image setting completion notification to the information processing apparatus 0109.

In step S1305, the information processing apparatus 0109 that has received the reference image setting completion notification transmits the main print job to the printing apparatus 0101.

In step S1306, the printing apparatus 0101 that has received the main print job from the information processing apparatus 0109 executes printing based on the received main print job.

In step S1307, the printing apparatus 0101 transmits a scan image obtained by scanning a printed matter obtained by printing, to the inspection apparatus 0108. In step S1308, the inspection apparatus 0108 executes inspection processing. In step S1309, the inspection apparatus 0108 notifies the printing apparatus 0101 of an inspection result.

In step S1310, the printing apparatus 0101 that has received the inspection result from the inspection apparatus 0108 transmits a printing completion notification to the information processing apparatus 0109. In step S1311, the printing apparatus 0101 that has received the inspection result from the inspection apparatus 0108 transmits an inspection end notification to the inspection apparatus 0108. The processing in steps S1310 and S1311 may be simultaneously performed being triggered by an inspection result notification from the inspection apparatus 0108, or the processing in step S1310 may be performed next to the processing in step S1311.

A series of procedures of the execution of reference image registration processing and inspection processing in an inspection system according to the present exemplary embodiment has been described above.

According to an exemplary embodiment of the present invention, it is possible to solve the issue of bothersome operations in which, in the method of determining an inspection setting after a job is executed, the user needs to issue an execution instruction of a main print job at a timing at which an inspection setting is completed, and there are many steps of user operations. The inspection system according to an exemplary embodiment of the present invention can reduce the number of operations of the user by executing a main print job at an appropriate timing, and can improve operability for inspection execution.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-049280, filed Mar. 25, 2022, which is hereby incorporated by reference herein in its entirety.

What is claimed is:

1. An inspection system comprising at least an inspection apparatus, a printing apparatus, and an information processing apparatus that are communicable with each other,
wherein the inspection apparatus includes:
one or more controllers having one or more processors and one or more memories, the one or more controllers configured to function as:
a receiving unit configured to receive a first print job including a reference image and inspection setting information;
a registration unit configured to register the reference image;
an inspection unit configured to inspect a scan image of a printed matter based on the reference image and an inspection setting; and
a first transmission unit configured to transmit a predetermined notification to the printing apparatus,
wherein the information processing apparatus includes:
one or more controllers having one or more processors and one or more memories, the one or more controllers configured to function as:
a second transmission unit configured to transmit the first print job for registering the reference image to the printing apparatus before the information processing apparatus receives the predetermined notification and a second print job for executing inspection to the printing apparatus in a case where the information processing apparatus has received the predetermined notification,
wherein the printing apparatus includes:
a printing unit configured to perform printing of the printed matter based on the second print job in a case where the printing apparatus has received the second print job; and
a reading unit configured to generate the scan image by reading the printed matter printed by the printing unit, and
wherein the one or more controllers of the inspection apparatus is configured to further function as a display unit configured to display a screen for setting the inspection setting in a case where the inspection setting information includes information indicating a new registration and, in a case where the inspection setting information includes information indicating execution of printing, based on reception of a selection of an object displayed in the screen, the first transmission unit is configured to transmit, to the printing apparatus, the predetermined notification as a notification of completion of the inspection setting and an instruction to transmit the second print job.

2. A control method of an inspection system including at least an inspection apparatus, an printing apparatus, and an information processing apparatus that are communicable with each other, the control method comprising:

receiving a first print job including a reference image and inspection setting information, by the inspection apparatus;
registering, by the inspection apparatus, the reference image;
inspecting, by the inspection apparatus, a scan image of a printed matter based on the reference image and an inspection setting;
transmitting, by the inspection apparatus, a predetermined notification to the printing apparatus; and
transmitting, by the information processing apparatus, the first print job for registering the reference image to the printing apparatus before the information processing apparatus receives the predetermined notification and a second print job for executing inspection to the printing apparatus in a case where the information processing apparatus has received the predetermined notification;
performing, by the printing apparatus, printing of the printed matter based on the second print job in a case where the printing apparatus has received the second print job; and
generating, by the printing apparatus, the scan image by reading the printed matter printed by the printing apparatus,
wherein the inspection apparatus is configured to further function as a display unit configured to display a screen for setting the inspection setting in a case where the inspection setting information includes information indicating a new registration and, in a case where the inspection setting information includes information indicating execution of printing, based on reception of a selection of an object displayed in the screen, the inspection apparatus transmits, to the printing apparatus, the predetermined notification as a notification of completion of the inspection setting and an instruction to transmit the second print job.

3. An inspection system comprising at least an inspection apparatus, a printing apparatus, and an information processing apparatus that are communicable with each other,
wherein the inspection apparatus includes:
one or more controllers having one or more processors and one or more memories, the one or more controllers configured to function as:
a receiving unit configured to receive a first print job including a reference image and inspection setting information;
a registration unit configured to register the reference image;
an inspection unit configured to inspect a scan image of a printed matter based on the reference image and an inspection setting; and
a first transmission unit configured to transmit a predetermined notification to the printing apparatus,
wherein the information processing apparatus includes:
one or more controllers having one or more processors and one or more memories, the one or more controllers configured to function as:
a second transmission unit configured to transmit the first print job for registering the reference image to the printing apparatus before the information processing apparatus receives the predetermined notification and a second print job for executing inspection to the printing apparatus in a case where the information processing apparatus has received the predetermined notification, wherein the printing apparatus includes:
one or more controllers having one or more processors and one or more memories, the one or more controllers configured to function as:
a receiving unit configured to receive the second print job;
a printing unit configured to perform printing of the printed matter based on the second print job in a case where the printing apparatus has received the second print job;
a reading unit configured to generate the scan image by reading the printed matter printed by the printing unit; and
a control unit configured to control the printing unit to execute printing that is based on the print job if the predetermined notification is received, and
wherein the one or more controllers of the inspection apparatus is configured to further function as a display unit configured to display a screen for setting the inspection setting in a case where the inspection setting information includes information indicating a new registration and, in a case where the inspection setting information includes information indicating execution of printing, based on reception of a selection of an object displayed in the screen, the first transmission unit is configured to transmit, to the printing apparatus, the predetermined notification as a notification of completion of the inspection setting and an instruction to transmit the second print job.

4. A control method of an inspection system including at least an inspection apparatus, a printing apparatus, and an information processing apparatus that are communicable with each other, the control method comprising:
transmitting, by the information processing apparatus, a first print job for registering a reference image to the printing apparatus before the information processing apparatus receives a predetermined notification and a second print job for executing inspection to the printing apparatus in a case where the information processing apparatus has received the predetermined notification;
receiving, by the inspection apparatus, the first print job including the reference image and inspection setting information;
registering the reference image in the inspection apparatus;
inspecting, by the inspection apparatus, a scan image of a printed matter based on the reference image and an inspection setting;
transmitting, by the inspection apparatus, a predetermined notification to the printing apparatus;
receiving, by the printing apparatus, the second print job;
executing printing of the printed matter based on the second print job in the printing apparatus; and
generating, by the printing apparatus, the scan image by reading the printed matter printed by the printing apparatus, wherein the inspection apparatus is configured to further function as a display unit configured to display a screen for setting the inspection setting in a case where the inspection setting information includes information indicating a new registration and, in a case where the inspection setting information includes information indicating execution of printing, based on reception of a selection of an object displayed in the screen, the inspection apparatus transmits, to the printing apparatus, the predetermined notification as a notification of completion of the inspection setting and an instruction to transmit the second print job.

5. The inspection system according to claim 1, wherein in a case where the inspection setting information is information indicating a preliminarily-designated inspection setting, the inspection apparatus sets the preliminarily-designated inspection setting based on the information indicating the preliminarily-designated inspection setting.

6. The inspection system according to claim 5, wherein the inspection setting information indicating the preliminarily-designated inspection setting is setting information about a preliminarily-designated region and a preliminarily-designated level.

7. The inspection system according to claim 3, wherein in a case where the inspection setting information is information indicating a preliminarily-designated inspection setting, the inspection apparatus sets the preliminarily-designated inspection setting based on the information indicating the preliminarily-designated inspection setting.

8. The inspection system according to claim 7, wherein the inspection setting information indicating the preliminarily-designated inspection setting is setting information about a preliminarily-designated region and a preliminarily-designated level.

9. The inspection system according to claim 1, wherein, in a case where the inspection setting information does not include the information indicating the execution of printing, based on reception of the selection of the object displayed in the screen, the first transmission unit transmits, to the printing apparatus, the predetermined notification as the notification of completion of the inspection setting and not as the instruction to transmit the second print job.

10. The inspection system according to claim 1, wherein, in a case where the inspection setting information does not include the information indicating the new registration and does not include the information indicating the execution of printing, the first transmission unit is configured to transmit, to the printing apparatus without the reception of the selection of the object displayed in the screen, the predetermined notification as the notification of completion of the inspection setting and the instruction to transmit the second print job.

* * * * *